US008712222B2

(12) United States Patent
Suzuki

(10) Patent No.: US 8,712,222 B2
(45) Date of Patent: Apr. 29, 2014

(54) EDITING DEVICE AND EDITING METHOD

(75) Inventor: Yoshiharu Suzuki, Hyogo (JP)

(73) Assignee: GVBB Holdings S.A.R.L., Luxembourg (DE)

( * ) Notice: Subject to any disclaimer, the term of this patent is extended or adjusted under 35 U.S.C. 154(b) by 125 days.

(21) Appl. No.: 13/001,029

(22) PCT Filed: Jun. 27, 2008

(86) PCT No.: PCT/JP2008/001690

§ 371 (c)(1),
(2), (4) Date: Dec. 22, 2010

(87) PCT Pub. No.: WO2009/157045

PCT Pub. Date: Dec. 30, 2009

(65) Prior Publication Data

US 2011/0103772 A1    May 5, 2011

(51) Int. Cl.
*H04N 5/761* (2006.01)
(52) U.S. Cl.
USPC .......................................... 386/282; 386/278
(58) Field of Classification Search
None
See application file for complete search history.

(56) References Cited

U.S. PATENT DOCUMENTS

| | | | |
|---|---|---|---|
| 5,448,287 A * | 9/1995 | Hull | 348/39 |
| 5,754,851 A | 5/1998 | Wissner | |
| 5,760,767 A | 6/1998 | Shore et al. | |
| 6,546,188 B1 | 4/2003 | Ishii et al. | |
| 6,965,723 B1 | 11/2005 | Abe et al. | |
| 2003/0018609 A1 * | 1/2003 | Phillips et al. | 707/1 |
| 2005/0117878 A1 * | 6/2005 | Murata et al. | 386/52 |
| 2005/0216840 A1 | 9/2005 | Salvucci | |
| 2005/0257152 A1 | 11/2005 | Shimizu et al. | |
| 2006/0236245 A1 * | 10/2006 | Agarwal et al. | 715/716 |
| 2006/0275938 A1 * | 12/2006 | Yuki et al. | 438/22 |
| 2007/0177675 A1 * | 8/2007 | Kawa et al. | 375/240.25 |
| 2007/0198546 A1 * | 8/2007 | Shintani | 707/100 |
| 2007/0274165 A1 * | 11/2007 | Tanaka et al. | 369/30.25 |

FOREIGN PATENT DOCUMENTS

| | | |
|---|---|---|
| EP | 1 102 274 A2 | 5/2001 |
| GB | 2 332 085 A | 6/1999 |
| JP | 200157660 | 2/2001 |
| JP | 2001057660 A | 2/2001 |
| JP | 2001202754 A | 7/2001 |
| JP | 2006129124 A | 5/2006 |

OTHER PUBLICATIONS

International Search Report and Written Opinion dated Mar. 20, 2009 for International Application No. PCT/JP2008/001690.
Office Action in Chinese Patent Application No. 200880130074.X issued Apr. 20, 2012.

(Continued)

*Primary Examiner* — Huy T Nguyen
*Assistant Examiner* — Eileen Adams
(74) *Attorney, Agent, or Firm* — Arent Fox LLP

(57) ABSTRACT

An editing device and editing method are provided for which it is possible for the operator to immediately recognize whether trim edit is possible or not at the stage of selecting the trim points, and eliminate unnecessary work. The editing device includes receiving means for receiving command input for trim editing; judging means for judging whether trim editing is possible or not based on the command input received by the receiving means; and notification means for outputting notification that editing is not possible when the judging means judges that editing is not possible.

14 Claims, 23 Drawing Sheets

(56) References Cited

OTHER PUBLICATIONS

Office Action for Chinese patent application No. 200880130074.X issued by the State Intellectual Property Office on Dec. 14, 2012.
Office Action for Japanese patent application No. 2010-546987 issued by the Japanese Patent Office on Nov. 27, 2012.
English translation of abstract for JP2001-057660.
Office Action issued for Japanese Patent Application No. 2010-546987, mailed by the SIPO on Nov. 27, 2012.
Translation of Notice of Reason for Rejection for Patent Application No. 2010-546987 dated Apr. 16, 2013.

\* cited by examiner

1

EDITING DEVICE AND EDITING METHOD

CROSS-REFERENCE TO RELATED APPLICATIONS

This Application is a National Stage filing under 35 U.S.C. 371 of International Application Number PCT/JP2008/001690 filed Jun. 27, 2008, the entire contents of which are hereby incorporated by reference herein in their entirety.

TECHNICAL FIELD

The present invention relates to an editing device and editing method for editing moving image data and/or sound data, and more particularly relates to an editing device and editing method capable of trim edit in which the clip length or reference position is varied.

BACKGROUND ART

Various types of applications that use various types of data, such as moving image data, still image data, sound data, text data, and so on, and carry out editing of images or sounds in response to editing information received from users, are provided as software that functions on personal computers, work stations, or other information processing devices.

The personal computer on which this type of editing application is installed functions as an editing device for editing moving images or sound data. The editing device generates image or sound data by reading in image or sound data stored on a recording medium, or moving image or sound data captured from a video camera or TV tuner, or the like, and carries out editing processes by connecting the desired portions and carrying out other processes.

The moving image and sound data used in an editing device is handled as clips that reference specific ranges of the data, for example one or a plurality of tracks are arranged along a time axis, which is referred to as the time line, and changes are made in accordance with editing information received from the user.

Editing tools for editing the clips arranged on the time line include editing methods known as "trim editing", in which the length or reference position of the clip of the data used is changed. Trim editing mainly includes (1) "normal trim" by moving the start position (In point) or the finish position (Out point) on the time line, to extend the length of a clip or fill a gap, (2) "slide trim" in which the boundary between two adjacent clips is moved on the time line, (3) "slip trim" in which the length of a clip or its position on the time line is not changed, but just the frames used are shifted, and (4) "rolling trim" in which the clip length and frames used are not changed, but the position on the time line is shifted by changing the length of the clips before and after the clip.

To move the In point of a clip arranged on a time line, it is possible to position the cursor of a mouse at the start of the clip and drag the cursor, so that the position of the start frame of the data referenced by the clip and the position of the In point on the time line are changed.

In the same way, to move the Out point of a clip, it is possible to position the cursor of a mouse at the finish of the clip and drag the cursor, so that the position of the last frame of the data referenced by the clip and the position of the Out point on the time line are changed.

Also, by positioning the cursor of the mouse at the boundary between clips arranged in a line on the same time line and dragging the cursor, it is possible to execute slide trim by changing the frame position of the data referenced by the two clips and the position of the boundary on the time line.

In normal trim edit, when the mouse cursor is positioned at the start position or finish position of a clip and dragged, the display color of the end of the clip is changed to a predetermined width, to indicate to the user that the position is designated as the subject of the editing. This end portion of a clip that is designated as the subject of the editing is referred to as the trim point, and it simplifies editing by indicating to the operator the position that is the subject of the trim editing. By dragging the end portion of the clip with the display color changed in this way, it is possible to move the clip end portion forward or backward, and it is possible to change the position of that end portion on the time line, the position of the data referenced by the end portion, and the clip length.

Also, if the end of one clip positioned at the boundary of two clips that are arranged adjacent to each other is selected as a trim point as described above, and then the mouse cursor is positioned on the end of the other clip positioned at the same boundary while pressing Ctrl and the mouse is clicked, the display color of the end portion of the clip changes to a predetermined width, and an additional trim point can be added. In this case, the position of the boundary between the two adjacent clips is selected as the trim point, this trim editing is displayed as a slide trim, and the position is displayed as the position that is the subject of the slide trim. By dragging and moving near the boundary of the two adjacent clips, it is possible to simultaneously change the position on the time line of the two end portions of the clips positioned on the boundary, the position of the data referenced by these end portions, and the length of both clips.

The trim points of a slide trim can be specified by positioning the mouse cursor on the boundary position between two clips and clicking, to simultaneously specify the end portions positioned at the boundary of the two adjacent clips as the trim points.

After positioning the mouse cursor on one end portion of a clip and clicking to select that end portion as a trim point, it is possible to position the mouse cursor on the other end portion of the same clip and click while pressing Ctrl, so that the display color of the end portions of the clip are changed to a predetermined width, and a trim point is added. In this case, the two end portions of the single clip are selected and displayed as trim points, and it is possible to display that a slip trim has been specified in which the frames of the data referenced in the start position and the finish position are changed, without changing the position or length on the time line of the clip. In this state, by dragging the position of one end portion of the clip, it is possible to shift the position of the data referenced, without changing the position or length of the clip on the time line.

In the case where there are clips adjacent to the front and rear of a single clip, and if the mouse cursor is positioned on one of either the rear end of the clip positioned to the front or the front end of the clip positioned to the rear and the mouse is clicked to select that end portion as a trim point, then by positioning the mouse cursor on the other of either the rear end of the clip positioned to the front or the front end of the clip positioned to the rear and the mouse is clicked while pressing Ctrl, the end portion of the clip can be added as a trim point. In this case, the end portions of the clips positioned to the front and the rear of a single clip can be displayed as trim points, and it is indicated that a rolling trim has been specified. In this state, by dragging near an end portion that has been selected as a trim point, it is possible to change the position on the time line of the end portions of the clips positioned to the front and rear of the clip and the position of the data referenced, and change the position on the time line of the clip sandwiched between the two clips, without changing the length of the clip sandwiched between the two clips or the position of the data referenced.

In the conventional editing device and editing method, when a combination of trim points is selected for which there is no corresponding editing method, there is no means for appropriately notifying the operator, and in this case the operation is not in accordance with what the operator has expected (for example, Patent Document 1). Patent Citation 1: Japanese Unexamined Patent Application Publication No. 2006-129124

DISCLOSURE OF INVENTION

Technical Problem

The editing device as described above is constituted so that the trim points can be specified and the trim method selected by clicking the end portions of the clip that is to be subject to editing so that the display color is changed.

In this way, specification of a plurality of trim points is allowed, so it is conceivable that in the process of selecting the trim points, a combination of trim points that does not correspond to any of the editing methods that have been provided in advance might be selected. For example, if the two end positions of a single clip and either of the end positions of the clips adjacent to this clip are selected as the trim points, there is no corresponding trim editing provided. Besides the example given here, there are many other combinations of trim points for which no editing method has been provided in advance.

In this way, in the state where there is no editing method corresponding to the selected combination of trim points, if the clip that is the subject of the editing is dragged, the device does not work properly, so the operator first recognizes that the combination of trim points is incorrect after starting to drag. In this case the operator must first deselect the currently selected trim points, and again select the trim points, and this has the problem that it makes the operation complicated. Also, in the state where there is no editing method corresponding to the combination of trim points is selected, when the clip that is to be edited is dragged, an operation that the operator did not expect or an erroneous operation could occur, depending on the editing device.

It is an object of the present invention to provide an editing device and editing method for which the operability of trim editing is good, and for which unexpected operation is prevented, and in particular for which it is possible for the operator to immediately recognize whether trim editing is possible or not at the stage of selecting the trim points, and eliminate unnecessary work.

A first aspect of the present invention provides an editing device having a function of trim editing for moving images and/or sound data, comprising: receiving unit being configured to receive command input for trim editing; judging unit being configured to judge whether trim editing is possible or not based on the command input received by the receiving unit; and notification unit being configured to output notification that editing is not possible when the judging unit judges that edit is not possible.

Here, the notification unit outputs display data for carrying out a first display at a trim when the judging unit judges that trim editing is possible, the trim point indicating a trim operation position, and the notification unit outputs display data for carrying out a second display when the judging unit judges that trim editing is impossible, the second display being different from the first display at the trim point.

Also, the first display may be displayed in a predetermined color, and the second display is displayed in a color that is different from the predetermined color of the first display.

Also, the present invention may be constituted so that when the judging unit judges that trim editing is not possible, the notification unit outputs predetermined sound data.

Further, the present invention may be constituted so that the trim editing includes at least two of trims among a normal trim that specifies an In point or an Out point, a slide trim, a slip trim, and a rolling trim.

Also, the present invention may be constituted so that the trim editing includes a ripple mode, and a process of the trim editing varies depending on whether the ripple mode is on or off.

Another aspect of the present invention provides an editing method according to the present invention is a trim editing method on an editing device having a function of trim editing for moving images and/or sound data, comprising the steps of: receiving command input for trim editing; judging whether trim editing is possible or not based on the received command input; and outputting notification that editing is not possible when judging that trim editing is not possible.

A further another aspect of the present invention provides a program for causing a computer on an editing device having a function of trim editing for moving images and/or sound data to execute the steps of:

receiving command input for trim editing; judging whether trim editing is possible or not based on the received command input; and outputting notification that editing is not possible when judging that editing is not possible.

In the present invention, at the stage of receiving trim editing command inputs, it is judged whether trim editing is possible or not, and the operator is notified in some way, so if a combination of trim points that does not correspond to the trim editing that is provided in advance is selected, the operator can immediately determine that that selection is inappropriate, so it is possible to eliminate unnecessary work caused by the selection of an incorrect combination of trim points. Further, it is possible to prevent incorrect or unexpected operation of the editing device caused by to the selection of an incorrect combination of trim points.

BEST MODE FOR CARRYING OUT THE INVENTION

Outline Constitution

The present invention is an editing device that integrates and edits data such as moving image data, static image data, sound data, text data, and the like, and is realized by a common personal computer such as a desk top computer or a laptop computer, and application software for editing moving images that is installed on this personal computer.

Figure 1:
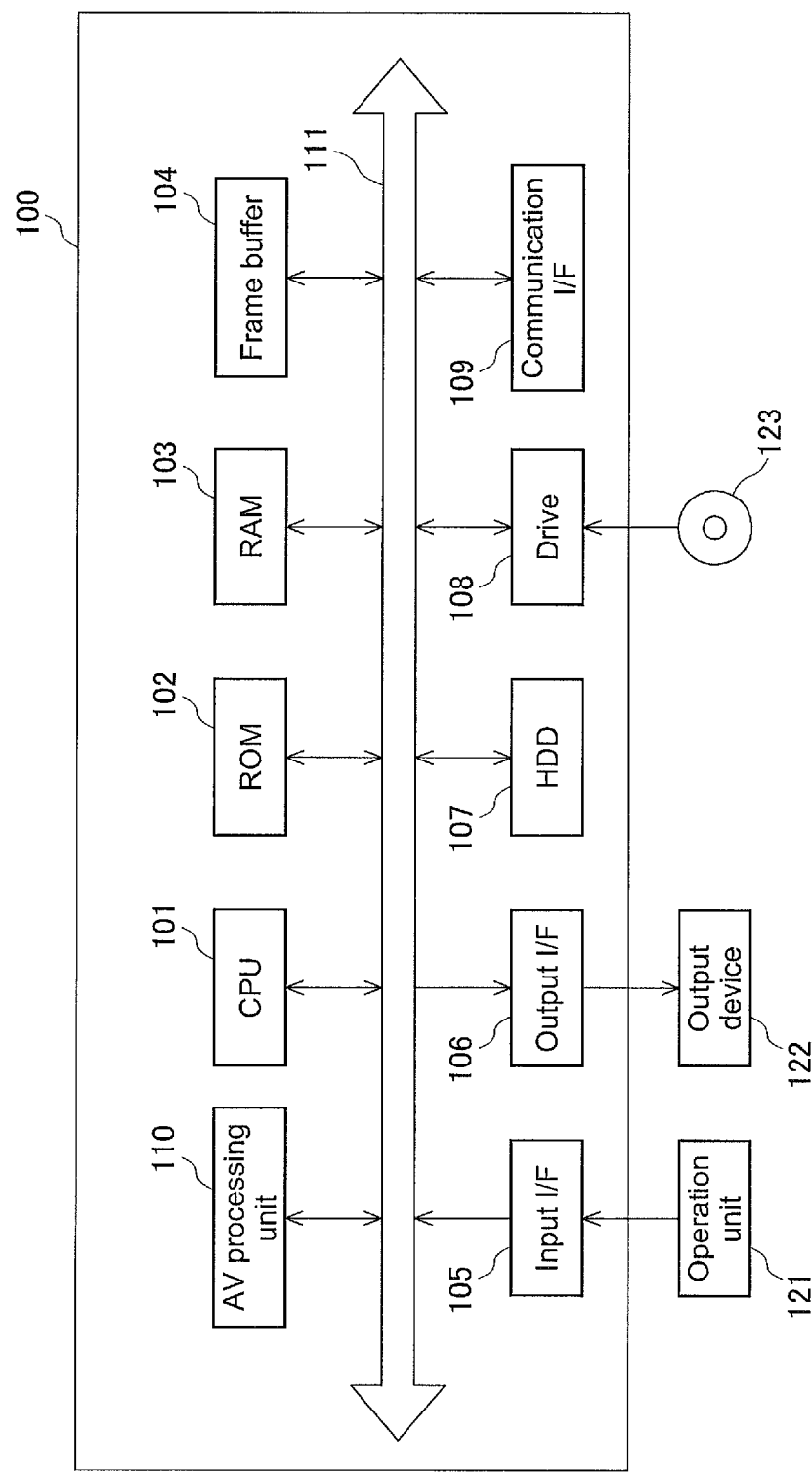
FIG. 1 is a block diagram showing the hardware constitution of an editing device according to the present invention.

The hardware constitution of the editing device according to the present invention is shown in FIG. 1.

As shown in FIG. 1, the editing device hardware constitution 100 includes the normal computer hardware constitution, including a CPU 101 that controls the entire device; a ROM 102 on which basic control programs such as BIOS and the like and various parameters are stored; a RAM 103 that temporarily stores data; a frame buffer 104 that stores image data that is to be displayed on a display; an input interface (I/F) 105 that receives input signals from an operation unit 121 that includes a keyboard, a mouse or another pointing device, and so on, and supplies the input signal to the CPU 101; an output interface (I/F) 106 connected to an output device 122 for displaying image data stored in the frame buffer 104 on a display and outputting sound data to a speaker; a hard disc drive (HDD) 107 that stores various kinds of data including an application program for editing; a drive 108 to which removable media 123 such as a CD, DVD, or other optical disc, a magnetic disc such as a flexible disc (FD), an opto-magnetic disc (MO), a blue ray disc (BD), semiconductor memory, or the like, is fitted; a communication interface (I/F) 109 that transmits and receives data via a network such as a local area network (LAN), the interne, or the like; an AV processing unit 110 that includes an interface for transmitting and receiving video and audio signals to and from external equipment and that has a compression and decompression function using the compression format of MPEG or the like; and a bus 111 that connects all the parts. The bus 111 is not necessarily a single bus, but may be a plurality of buses in a layered structure.

(Function Blocks)

Figure 2:
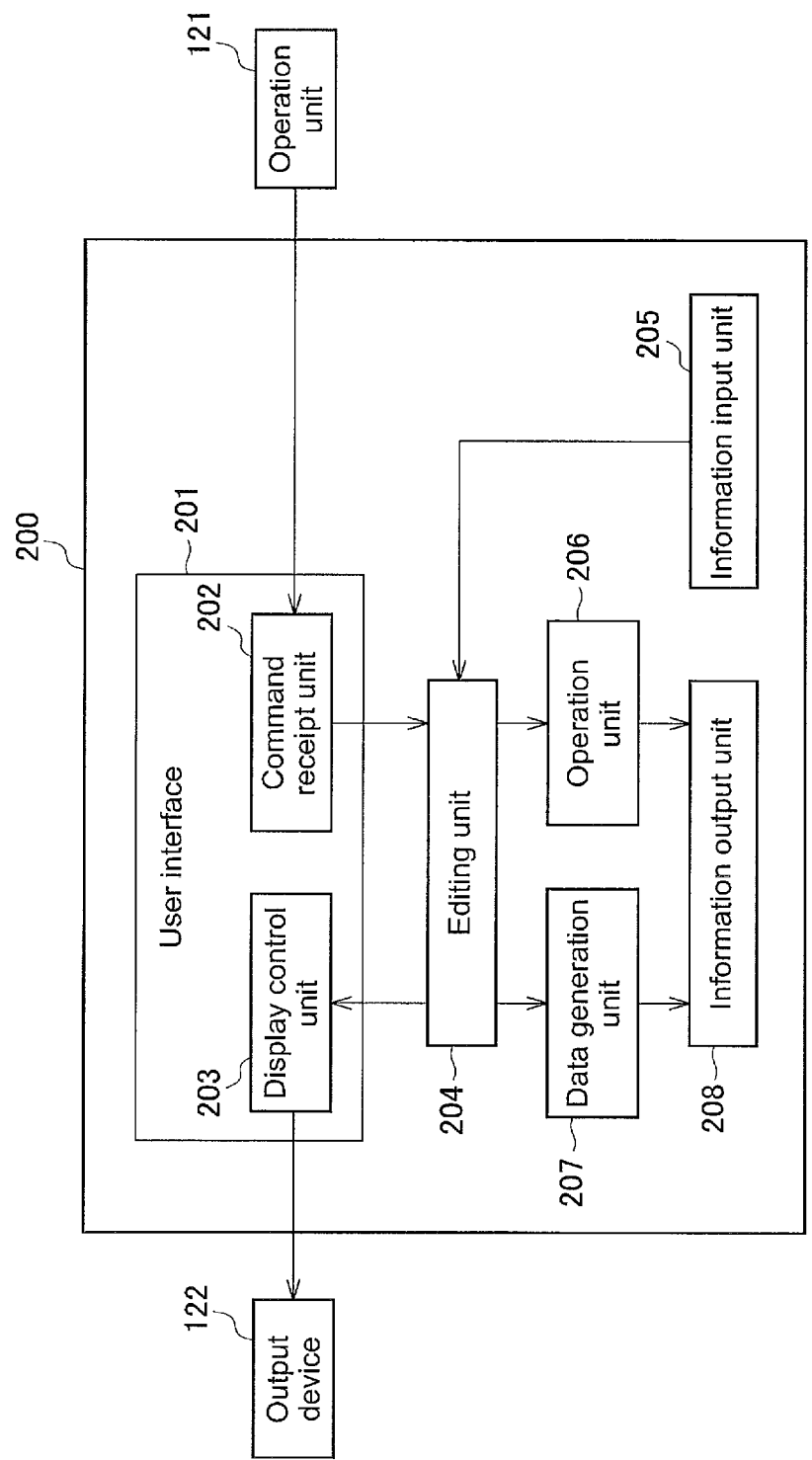
FIG. 2 is a functional block diagram of an editing device according to the present invention.

FIG. 2 is a block diagram showing the functional constitution 200 of the editing device 100. The application program of the editing device 100 includes a user interface 201, an editing unit 204, an information input unit 205, an edit data generation unit 206, a data generation unit 207, and an information output unit 208 as function blocks.

The user interface 201 includes a command receipt unit 202 that receives command inputs input by the operator via the operation unit 121, and a display control unit 203 that carries out display control for the output device 122 such as a display or speaker or the like.

The editing unit 204 executes editing processes based on commands input from the operation unit 121 via the user interface 201.

The information input unit 205 reads a part or all of the data referenced by the clips handled by the editing unit 204, such as data stored on the HDD 107, the removable media 123, or data existing on the network, and inputs the data to the editing unit 204.

The edit data generation unit 206 generates the edit details edited by the editing unit 204 based on command inputs input via the operation unit 121 as edit data, for example, information such as position of a clip on the time line, position of data referenced, and so on, is generated as an edit data file. The edit data file generated by the edit data generation unit 206 may use a format that can be used in common between applications, for example the files may be generated in AAF, XML, EDL, or other formats.

The data generation unit 207 generates data files with all of the data from specific resources or a part that has been extracted, based on each clip contained in the contents edited by the editing unit 204, when the data referenced by the clips is output as project data together with the edit data file. The data file may be constituted by extracting only the referenced range of the data referenced by each clip, or a predetermined margin may be added to the front and rear to increase the amount of freedom for subsequent edits.

The information output unit 208 exports the edit data file generated by the edit data generation unit 206 and the data file generated by the data generation unit 207 as project information. The project information output from the information output unit 208 can, for example, be used by other applications, for example, the project information can be used for various editing purposes such as editing of the audio data only using editing software for creating music.

(Editing Screen)

Figure 4:
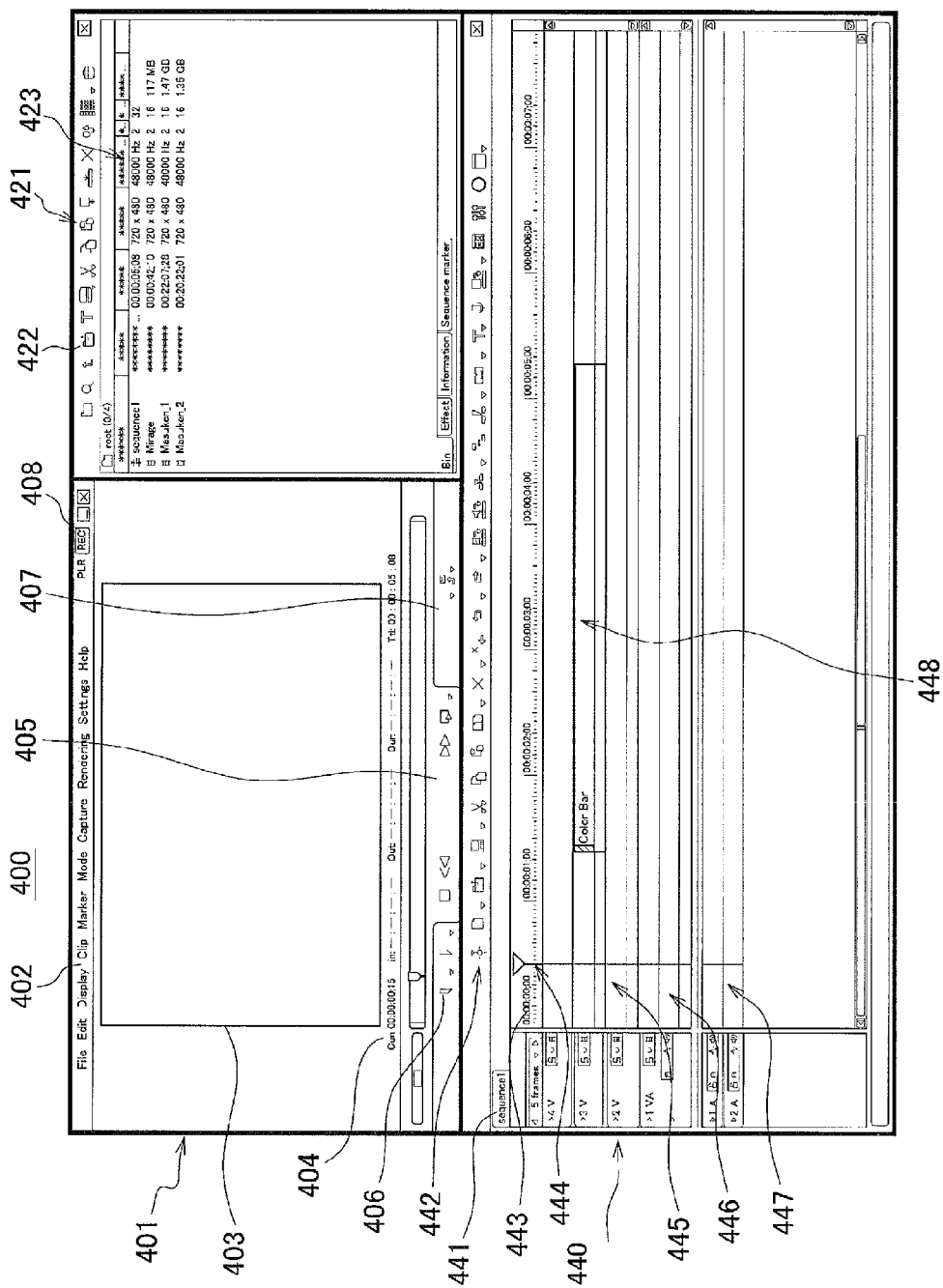
FIG. 4 is an explanatory diagram showing an example of an editing screen of the present invention.

FIG. 4 is an explanatory diagram showing an example of an editing screen of the editing device 100.

Various windows are provided in the editing device 100, and each window can be displayed arranged in a preferred layout, and each window can be re-sized by dragging the sides or corners. In FIG. 4, an example is shown of an editing screen 400 that includes three frequently used windows (1) a preview window 401 (shown on the top left in FIG. 4), (2) a bin window 421 (shown in the top right in FIG. 4), and (3) a time line window 440 (shown in the bottom portion in FIG. 4) as a customized window layout for a single monitor.

The preview window 401 includes a menu bar 402 on which various kinds of operation items for receiving operation commands are arranged; a player/recorder display window 403 that displays images such as replay of clips or replay of contents on the time line, and so on; a time code area 404 that displays the current replay position, In point, Out point, duration, total length of the source data or total length on the time line; control buttons 405 for commands controlling replay, fast forward, stop, and so on for replay of the time line of clips; and edit buttons 406, 407 used for setting In points and Out points, inserting clips on the time line, capturing, reflecting clips to the bin, and so on.

In the event that the preview window 401 arranged on the top left in FIG. 4 is in a single mode that combines a player that replays clips and a recorder that replays contents on the time line in the one display window, the preview window 401 is constituted so that it is possible to switch between player display and recorder display by operating a display switching button 408 provided on the top of the screen.

Instead of this type of player/recorder display window 403, it is possible to simultaneously display a player display window that replays clips and a recorder display window that replays the contents on the time line. For example, a dual mode may be provided in which both the player display window and the recorder display window are displayed simultaneously, and by displaying in this dual mode it is possible to see the images of both at the same time without switching.

The menu bar 403 may include, for example, file, edit, display, clip, marker, mode, capture, rendering, settings, help, and so on, and it is possible to open a more detailed menu from their respective pull-down menus by clicking on the respective items. The method of displaying the detailed menu is not limited to pull-down menus, but may be achieved by various methods.

The bin window 421 provided in the top right of FIG. 4 is a window for managing clips extracted and read from data, and includes operation buttons 422 for receiving various operations, and a clip view 423 that displays a list of clips, and so on.

In the clip view 423, it is possible to select various display methods besides the display of data details as shown in the figure, such as icon display or display of thumbnail images of specified frames, and so on.

The time line window 440 provided in the bottom portion of FIG. 4 is an editing window in which clips are arranged in a time series from left to right, so that the position of each clip within the contents, the clip lengths, and the position of the data referenced can be changed, and various effects can be applied. The time line window 440 includes a sequence tab 441 for handling the clips arranged on the time line all together; a plurality of operation buttons 442 that receive various operation commands; a time scale 443 that displays the time scale for the time line; a time line cursor 444 for displaying clip replay positions and editing positions; a V track 445 on which video clips are arranged; a VA track 446 on which video clips and associated audio clips are arranged; and an A track 447 on which audio clips are arranged, and so on. When necessary it is possible to set a plurality of V tracks 445, VA tracks 446, or A tracks 447, and to delete them when unnecessary. Also, a T track for displaying title tracks may be provided.

When a clip in the bin window 421 is dragged and dropped on a track in the time line window 440, the clip is displayed in the form of a band with a different color background, based on the time scale 443 of the time line window 440. For example, in FIG. 4, an example is shown in which a video track 448 is arranged on the V track.

(Trim Editing)

In the editing device 100, it is possible to change the position, length, position, and so on, of the data referenced, on the time line of each clip to be edited. When carrying out this kind of trim editing, by clicking mode from the menu bar of the preview window and selecting trim from the pull down menu that opens, the preview window is switched to the trim mode, and it is possible to carry out operations in the preview window. Also, it is possible to carry out trim editing by carrying out direct operations on clips arranged on a track of the time line window.

When carrying out trim editing, the editing unit 204 executes editing processes based on command inputs regarding editing from the operator, while the commands received from the operator are displayed on the display.

Figure 3:
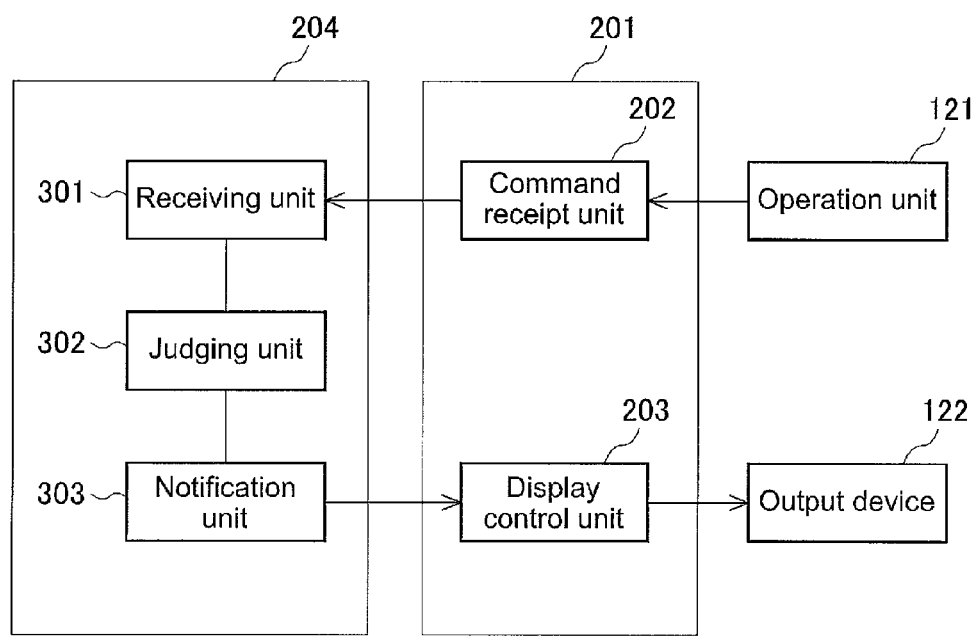
FIG. 3 is a block diagram showing the main parts of an editing device according to the present invention.

As shown in FIG. 3, command inputs regarding edit are input to the editing unit 204 from the operation unit 121 via the command receipt unit 202.

The editing unit 301 includes receiving unit 301 for receiving command inputs for trim editing; judging unit for judging whether trim editing is possible or not based on the command inputs received by the receipt unit 301; and notification unit 303 for outputting in some form notifications that editing is not possible when the judging unit 302 judges that trim editing is not possible.

The command receipt unit 202 is constituted by a user interface for receiving command inputs input by the operator via buttons displayed on the display, and the command inputs received by the command receipt unit 202 are transmitted to the receipt unit 301 of the editing unit 204. The receipt unit 301 interprets what kind of trim editing the command relates to based on the received command input and transmits the result to the judging unit 302.

The judging unit 302 judges whether the trim editing command is appropriate or not, and transmits the result of the judging to the notification unit 303. For example, if it is judged that the combination of selected trim points does not correspond to a trim editing method that is already provided, the result of the judging that improper trim points have been selected is transmitted to the notification unit 303.

The notification unit 303 transmits the notification to the display control unit 203 based on the received judging result. For example, the display control unit 203 may be constituted so that if the judging unit 302 judges that trim editing is possible for the command input for the trim point selection command, the notification unit 303 outputs to the display control unit 203 an output signal indicating that the selected trim points are an appropriate selection, and the display control unit 203 outputs display data to display the trim points in yellow or green. Also, the display control unit 203 may be constituted so that if the judging unit 302 judges that trim editing is not possible for the command input for the trim point selection command, the notification unit 303 outputs to the display control unit 203 an output signal indicating that the selected trim points are an inappropriate selection, and the display control unit 203 outputs display data to display the trim points in red.

The following is further detailed explanation of the trim point selection for trim editing.

(In Point Selection)

Figure 5:
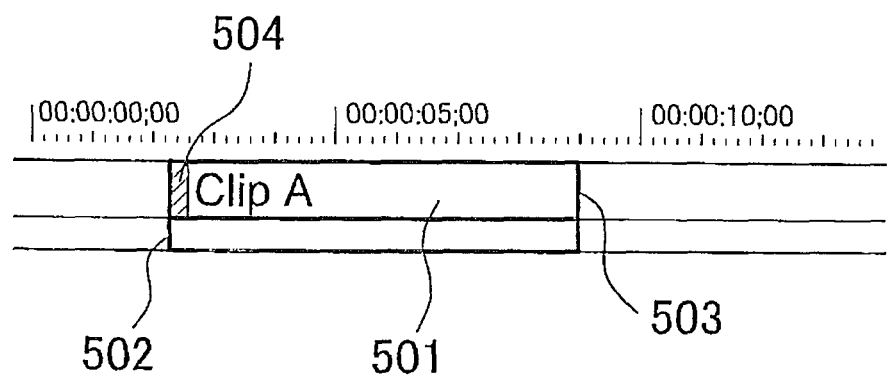
FIG. 5 is an explanatory diagram of trim editing by In point selection.

FIG. 5 is an explanatory diagram showing the case where the In point of a clip (Clip A) 501 arranged on the time line is selected as a trim point. The clip 501 arranged on the time line includes an In point 502 and an Out point 503. When the In point 502 of the clip (Clip A) 501 is to be selected as a trim point, the mouse cursor is positioned near the In point 502 and clicked.

At this time, in order to indicate that the In point 502 of the clip (Clip A) 501 has been selected as a trim point, a trim point display portion 504 with a predetermined width is provided, and the color of the trim point display portion 504 may be changed to yellow or other colors.

Figure 10:
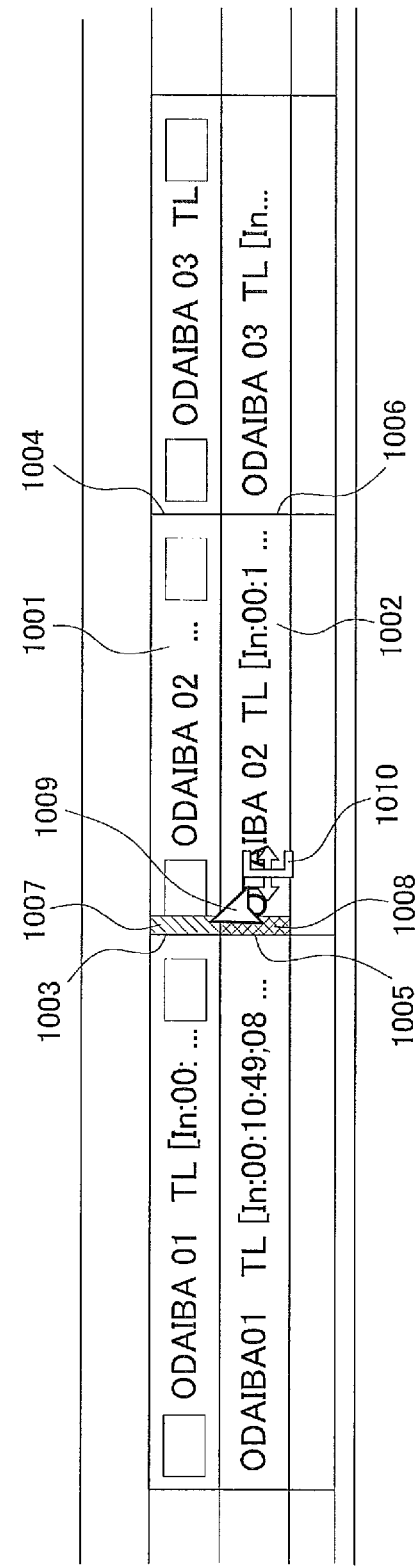
FIG. 10 is an explanatory diagram of trim editing by In point selection.

As shown in FIG. 10, it is possible to trim a video clip (Odaiba 02) 1001 arranged on a VA track and its associated audio clip (Odaiba 02) 1002 at the same time, and both In points can be selected simultaneously as trim points. For example, if the video clip (Odaiba 02) 1001 has an In point 1003 and an Out point 1004, and the audio clip (Odaiba 02) 1002 has an In point 1005 and an Out point 1006, by positioning a mouse cursor 1009 near the In points of both clips and clicking, the In points of the two clips can be simultaneously selected as trim points. At this time, in order to indicate that the In points of the two clips have been selected as trim points, trim point display portions 1007, 1008 are provided, and are displayed in predetermined colors. The trim point display portions 1007, 1008 may be constituted so that only the most recently selected trim point is displayed in, for example, yellow, and other trim points are displayed in, for example, green, in the example shown on the drawing, the trim point display portion 1007 of the video clip (Odaiba 02) 1001 is displayed in yellow, and the trim point display portion 1008 of the audio clip (Odaiba 02) 1002 is displayed in green.

When the In points of the clips are selected as trim points, if the mouse cursor is brought close to the trim points, a trim cursor 1010 is displayed, as shown in FIG. 10. The trim cursor 1010 shown in FIG. 10 is the trim cursor for carrying out trim editing when the In point is selected, and when this trim cursor is displayed, it is possible to drag the In points 1003, 1005 to change the position on the time line, the clip length, and the position of the data referenced by the In points.

(Out Point Selection)

Figure 6:
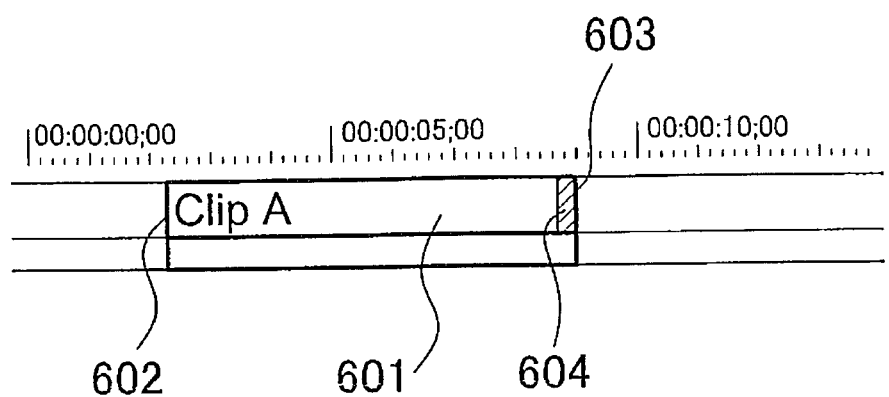
FIG. 6 is an explanatory diagram of trim editing by Out point selection.

FIG. 6 is an explanatory diagram showing the case where the Out point of a clip (Clip A) 601 arranged on the time line is selected as a trim point. The clip (Clip A) 601 arranged on the time line includes an In point 602 and an Out point 603. When the Out point 603 of the clip (Clip A) is to be selected as a trim point, the mouse cursor is positioned near the Out point 603 and clicked.

At this time, in order to indicate that the Out point 603 of the clip (Clip A) 601 has been selected as a trim point, a trim point display portion 604 with a predetermined width is provided, and the color of the trim point display portion 604 may be changed to yellow or another color.

Figure 11:
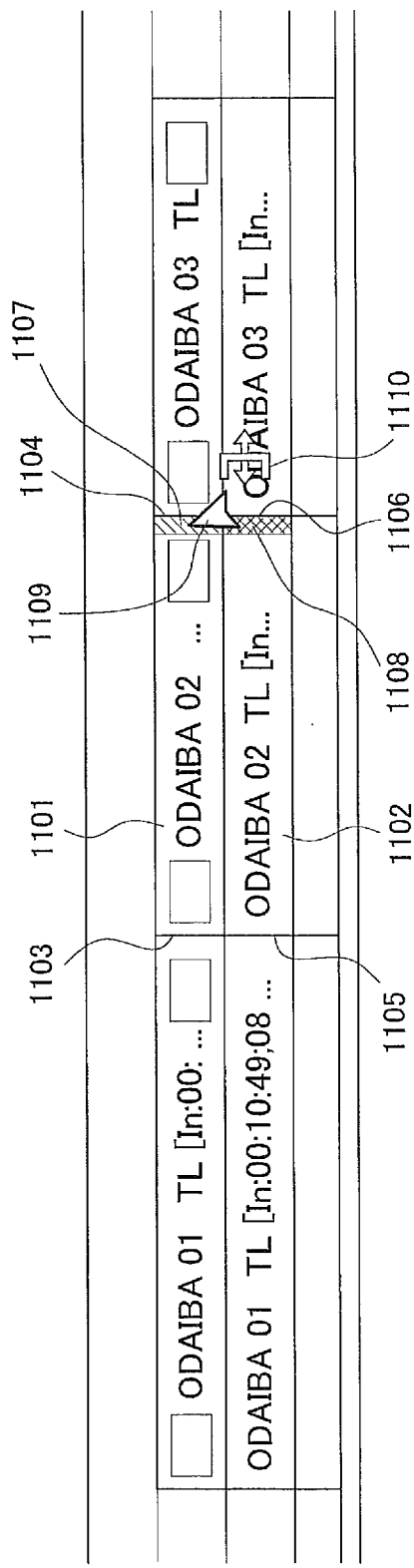
FIG. 11 is an explanatory diagram of trim editing by Out point selection.

As shown in FIG. 11, it is possible to trim a video clip (Odaiba 02) 1101 arranged on a VA track and its associated audio clip (Odaiba 02) 1102 at the same time, and both Out points can be selected simultaneously as trim points. For example, if the video clip (Odaiba 02) 1101 has an In point 1103 and an Out point 1104, and the audio clip (Odaiba 02) has an In point 1105 and an Out point 1106, by positioning a mouse cursor 1109 near the Out points of both clips and clicking, the Out points of the two clips can be simultaneously selected as trim points. At this time, in order to indicate that the Out points of the two clips have been selected as trim points, trim point display portions 1107, 1108 are provided, and are displayed in predetermined colors. The trim point display portions 1107, 1108 may be constituted so that only the most recently selected trim point is displayed in, for example, yellow, and other trim points are displayed in, for example, green, in the example shown on the drawing, the trim point display portion 1107 of the video clip (Odaiba 02) 1101 is displayed in yellow, and the trim point display portion 1108 of the audio clip (Odaiba 02) 1102 is displayed in green.

When the Out points of the clip are selected as trim points, if the mouse cursor is brought close to the trim points, a trim cursor 1110 is displayed, as shown in FIG. 11. The trim cursor 1110 shown in FIG. 11 is the trim cursor for carrying out trim editing when the Out point is selected, and when this trim cursor is displayed, it is possible to drag the Out points 1104, 1106 to change the position on the time line, the clip length, and the position of the data referenced by the Out points.

(Slide Trim)

Figure 7:
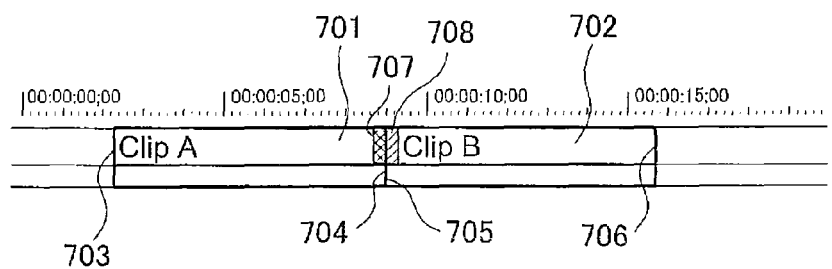
FIG. 7 is an explanatory diagram of trim editing by slide trim.

FIG. 7 is an explanatory diagram showing the case where the boundary position between a clip (Clip A) 701 and a clip (Clip B) 702 arranged adjacent to each other on the time line is selected as a trim point. The clip (Clip A) 701 arranged on the time line includes an In point 703 and an Out point 704, and the clip (Clip B) 702 includes an In point 705 and an Out point 706. The Out point 704 of the clip (Clip A) 701 and the In point 705 of the clip (Clip B) 702 are contiguous, and by simultaneously selecting these two end portions as trim points, it is possible to carry out a slide trim.

First, the mouse cursor is positioned near the Out point 704 of the clip (Clip A) 701 and clicked, then by positioning the mouse cursor near the In point 705 of the clip (Clip B) 702 and clicking while pressing Ctrl, it is possible to select both as trim points.

Also, by positioning the mouse cursor at the boundary of the clip (Clip A) 701 and the clip (Clip B) 702 and clicking, it is possible to simultaneously select the Out point 704 of the clip (Clip A) 701 and the In point 705 of the clip (Clip B) 702 as trim points.

At this time, in order to indicate that the Out point 704 of the clip (Clip A) 701 and the In point 705 of the clip (Clip B) 702 have been selected as trim points, trim point display portions 707, 708 each having a predetermined width are provided, and the trim point display portions 707, 708 are displayed in predetermined colors. In the example shown in the drawing, the trim point 707 of the clip (Clip A) 701 is displayed in green, and the trim point 708 of the clip (Clip B) 702 is displayed in yellow.

Figure 12:
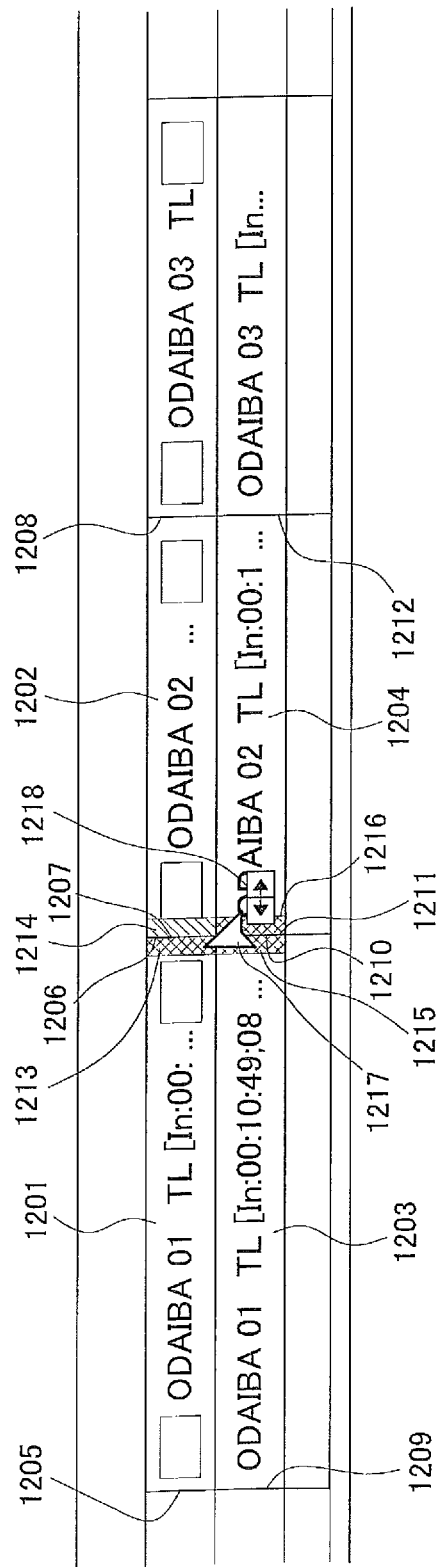
FIG. 12 is an explanatory diagram of trim editing by slide trim.

As shown in FIG. 12, in the case where a video clip (Odaiba 01) 1201 arranged on a VA track and its associated audio clip (Odaiba 01) 1203 and a video clip (Odaiba 02) 1202 and its associated audio clip (Odaiba 02) 1204 are arranged contiguously, it is possible to simultaneously carry out trim on the video clips and their associated audio clips, and selection of trim points can also be carried out simultaneously.

For example, assume the video clip (Odaiba 01) 1201 includes an In point 1205 and an Out point 1206, and the audio clip (Odaiba 01) 1203 associated with this video clip (Odaiba 01) 1201 includes an In point 1209 and an Out point 1210. Also, assume that adjacent to these clips the video clip (Odaiba 02) 1202 includes an In point 1207 and an Out point 1208, and the audio clip (Odaiba 02) 1204 associated with this video clip (Odaiba 02) 1202 includes an In point 1211 and an Out point 1212.

By positioning a mouse cursor 1217 at the Out point 1206 of the video clip (Odaiba 01) 1201 and the Out point 1210 of the audio clip (Odaiba 01) 1203 and clicking, and then positioning the mouse cursor 1217 at the In point 1207 of the video clip (Odaiba 02) 1202 and the In point 1211 of the audio clip (Odaiba 02) 1204 and clicking while pressing Ctrl, it is possible to select each point as a trim point.

Also, by positioning the mouse cursor 1217 at the position of the boundary between the video clips 1201, 1202 or the audio clips 1203, 1204 and clicking, it is possible to simultaneously select these four points as trim points.

At this time, in order to indicate that these points have been selected as trim points, trim point display portions 1213, 1214, 1215, 1216 are provided at the Out point 1206 of the video clip (Odaiba 01) 1201, the In point 1207 of the video clip (Odaiba 02) 1202, the Out point 1210 of the audio clip (Odaiba 01) 1203, and the In point 1211 of the audio clip (Odaiba 02) respectively, and the trim point display portions 1213, 1214, 1215, 1216 are displayed in predetermined colors. In the example shown in the drawing, only the trim point display portion 1214 is displayed in yellow, and the others are displayed in green.

With the position of the boundary of the clips selected as trim points, if the mouse cursor is brought near to the trim points, a trim cursor 1218 is displayed as shown in FIG. 12. The trim cursor shown in FIG. 12 is a trim cursor for carrying out trim editing by a slide trim, and when this trim cursor is displayed, it is possible to change the position on the time line, the clip length, and the position of the data referenced by the boundary position by dragging the boundary position of the video clips 1201, 1202 and the boundary position of the audio clips 1203, 1204.

(Slip Trim)

Figure 8:
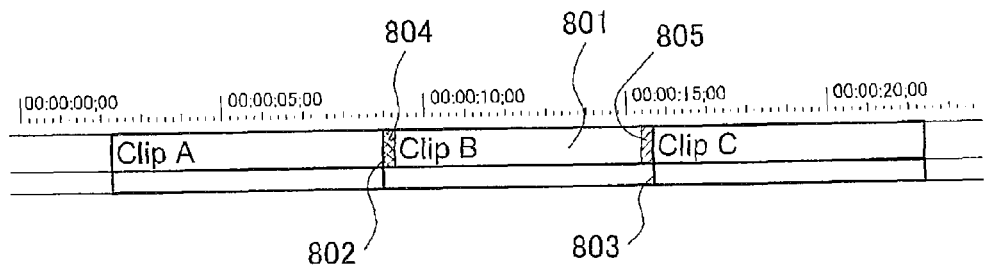
FIG. 8 is an explanatory diagram of trim editing by slip trim.

FIG. 8 is an explanatory diagram showing the case where the In point and the Out point of a clip (Clip B) 801 arranged on the time line are selected to carry out a slip trim.

The clip (Clip B) 801 arranged on the time line includes an In point 802 and an Out point 803. First, by positioning the mouse cursor near the In point 802 of the Clip (Clip B) 801 and clicking, and then positioning the mouse cursor near the Out point 803 of the clip (Clip B) 801 and clicking while pressing Ctrl, it is possible to select both as trim points.

At this time, in order to indicate that the In point 802 and the Out point 803 of the clip (Clip B) 801 have been selected as trim points, trim point display portions 804, 805 each having a predetermined width are provided, and the trim point display portions 804, 805 are displayed in predetermined colors. In the example shown in the drawing, the trim point 804 of the clip (Clip B) 801 is displayed in green, and the trim point 805 is displayed in yellow.

Figure 13:
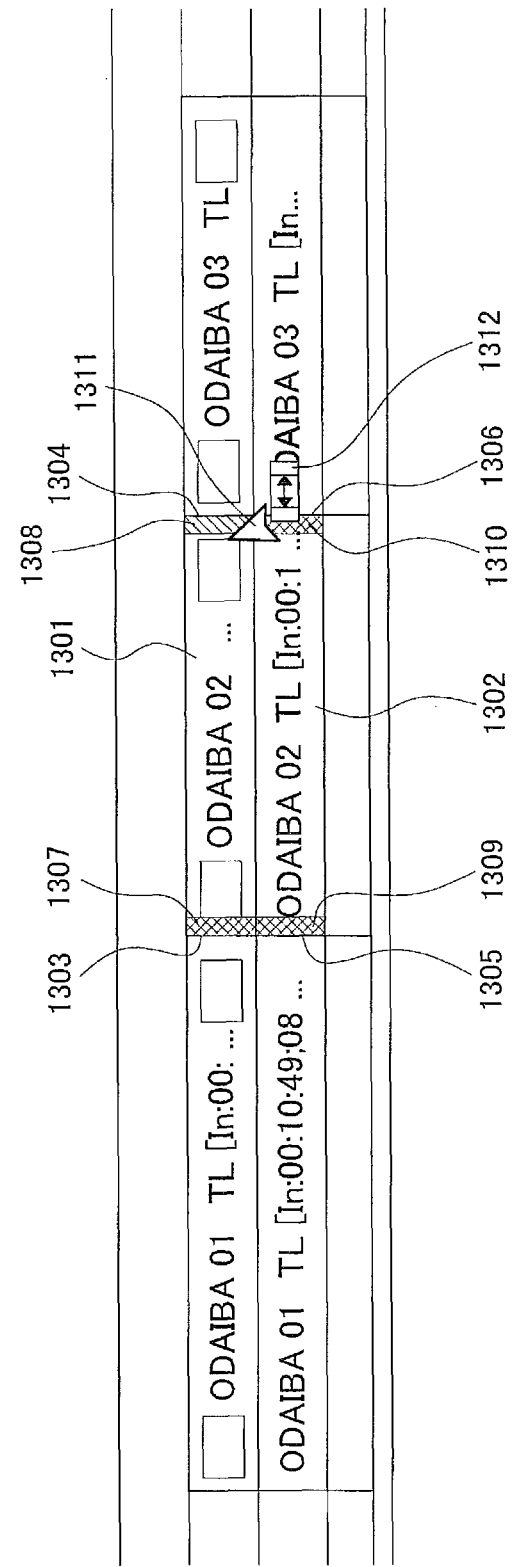
FIG. 13 is an explanatory diagram of trim editing by slip trim.

As shown in FIG. 13, when a video clip (Odaiba 02) 1301 arranged on a VA track and its associated audio clip (Odaiba 02) 1302 are arranged, it is possible to simultaneously carry out trim on the video clip (Odaiba 02) 1301 and its associated audio clip (Odaiba 02) 1302, and the trim points can also be simultaneously selected.

For example, assume that the video clip (Odaiba 02) 1301 includes an In point 1303 and an Out point 1304, and the audio clip (Odaiba 02) 1302 associated with the video clip (Odaiba 02) 1301 includes an In point 1305 and an Out point 1306.

By positioning a mouse cursor 1311 at the In point 1303 of the video clip (Odaiba 02) 1301 and the In point 1305 of the audio clip (Odaiba 02) 1302 and clicking, then positioning the mouse cursor 1311 at the Out point 1304 of the video clip (Odaiba 02) 1301 and the Out point 1306 of the audio clip (Odaiba 02) 1302 and clicking while pressing Ctrl, it is possible to select each point as trim points.

At this time, in order to indicate that the trim points have been selected, trim point display portions 1307, 1308, 1309, 1310 are provided at the In point 1303 and Out point 1304 of the video clip (Odaiba 02) 1301 and the In point 1305 and Out point 1306 of the audio clip (Odaiba 02) 1302 respectively, and are displayed in predetermined colors. In the example shown in the drawing, only the trim point display portion 1308 is displayed in yellow, and all the others are displayed in green.

In this state in which the In point and the Out point of the same clip are selected as trim points, if the mouse cursor is brought close to the trim points, a trim cursor 1312 is displayed as shown in FIG. 13. The trim cursor 1312 shown in FIG. 13 is a trim cursor for carrying out trim editing by slip trim, and when this trim cursor is displayed, it is possible to change the position of the data referenced, without changing the position and length of each clip on the time line, by dragging the In points or the Out points of the video clip (Odaiba 02) 1301 and the audio clip (Odaiba 02) 1302.

(Rolling Trim)

Figure 9:
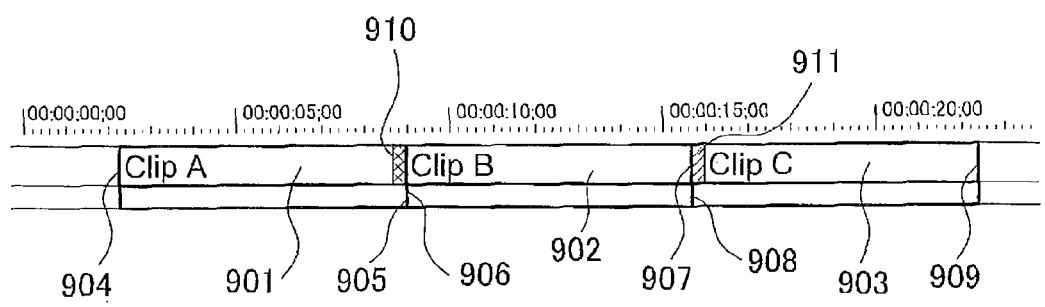
FIG. 9 is an explanatory diagram of trim editing by rolling trim.

FIG. 9 is an explanatory diagram for explaining the selection of trim points when carrying out a rolling trim in which a clip (Clip A) 901, a clip (Clip B) 902, and a clip (Clip C) 903 are arranged adjacently on the time line, and the position on the time line is changed by changing the length of the clips 901, 903 positioned to the front and the rear without changing the length of and the position of the data referenced by the clip (Clip B) 902 that is sandwiched in the center.

The clip (Clip A) 901 arranged on the time line includes an In point 904 and an Out point 905, the clip (Clip B) 902 arranged on the time line includes an In point 906 and an Out point 907, and the clip (Clip C) 903 arranged on the time line includes an In point 908 and an Out point 909. The Out point 905 of the clip (Clip A) 901 and the In point 906 of the clip (Clip B) 902 are contiguous, and the Out point 907 of the clip (Clip B) 902 and the In point 908 of the clip (Clip C) 903 are contiguous.

First, by positioning the mouse cursor near the Out point 905 of the clip (Clip A) 901 and clicking, then positioning the mouse cursor near the In point 908 of the clip (Clip C) 903 and clicking while pressing Ctrl, it is possible to select both as trim points.

At this time, in order to indicate that the Out point 905 of the clip (Clip A) 901 and the In point 908 of the clip (Clip C) 903 have been selected as trim points, trim point display portions 910, 911 each having a predetermined width are provided, and the trim point display portions 910, 911 are displayed in predetermined colors. In the example shown in the drawing, the trim point 910 of the clip (Clip A) 901 is displayed in green, and the trim point 911 of the clip (Clip C) 903 is displayed in yellow.

Figure 14:
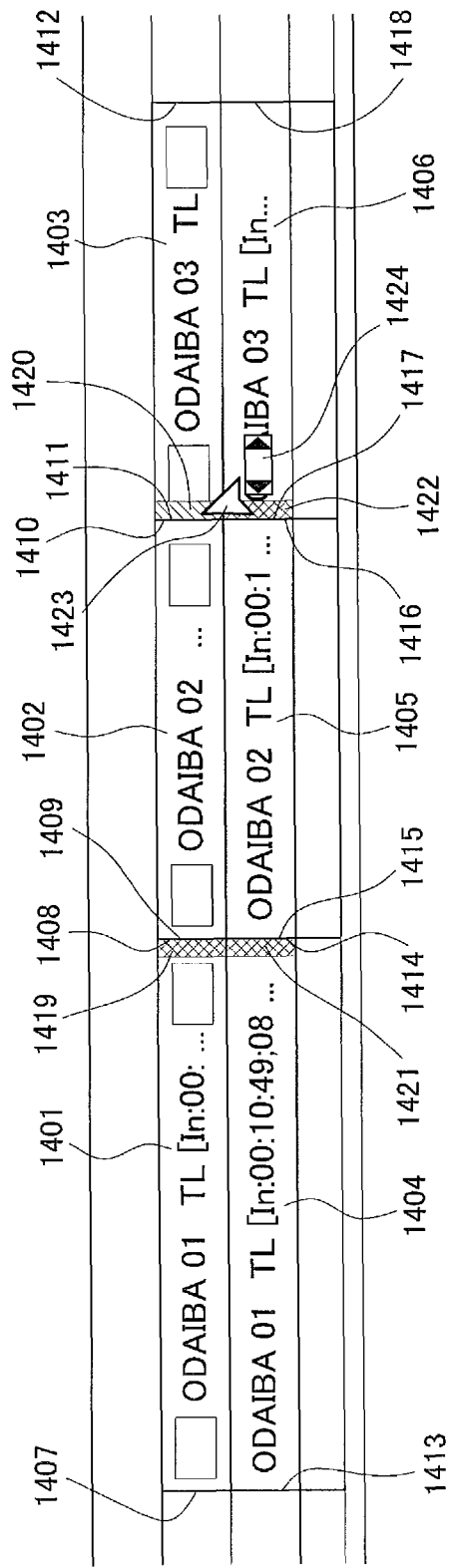
FIG. 14 is an explanatory diagram of trim editing by rolling trim.

As shown in FIG. 14, consider the case where a video clip (Odaiba 01) 1401 arranged on a VA track and its associated audio clip (Odaiba 01) 1404, a video clip (Odaiba 02) 1402 and its associated audio clip (Odaiba 02) 1405, and a video clip (Odaiba 03) 1403 and its associated audio clip (Odaiba 03) 1406 are arranged contiguously.

The video clip (Odaiba 01) 1401 includes an In point 1407 and an Out point 1408, and the audio clip (Odaiba 01) 1404 associated with the video clip (Odaiba 01) 1401 includes an In point 1413 and an Out point 1414. Also, arranged contiguous to these clips, the video clip (Odaiba 02) 1402 includes an In point 1409 and an Out point 1410, and the audio clip (Odaiba 02) 1405 associated with the video clip (Odaiba 02) 1402 includes an In point 1415 and an Out point 1416. Further, arranged contiguous to these clips, the video clip (Odaiba 03) 1403 includes an In point 1411 and an Out point 1412, and the audio clip (Odaiba 03) 1406 associated with the video clip (Odaiba 03) 1403 includes an In point 1417 and an Out point 1418.

By positioning a mouse cursor 1423 at the Out point 1408 of the video clip (Odaiba 01) 1401 and the Out point 1414 of the audio clip (Odaiba 01) 1404 and clicking, then positioning the mouse cursor 1423 at the In point 1411 of the video clip (Odaiba 03) 1403 and the In point 1417 of the audio clip (Odaiba 03) 1406 and clicking while pressing Ctrl, it is possible to select each point as trim points.

At this time, in order to indicate that the trim points have been selected, trim point display portions 1419, 1420, 1421, 1422 are provided at the Out point 1408 of the video clip (Odaiba 01) 1401, the In point 1411 of the video clip (Odaiba 03) 1403, the Out point 1414 of the audio clip (Odaiba 01) 1404, and the In point 1417 of the audio clip (Odaiba 03) 1406 respectively, and are displayed in predetermined colors. In the example shown in the drawing, only the trim point display portion 1420 is displayed in yellow, and the others are displayed in green.

When these trim points are selected, if the mouse cursor is brought near to the trim points, a trim cursor 1424 is displayed, as shown in FIG. 14. The trim cursor 1424 shown in FIG. 14 is a trim cursor for carrying out trim editing by a rolling trim, and when this trim cursor is displayed, it is possible to edit by rolling trim. In this case, by simultaneously dragging the Out points of the video clip (Odaiba 01) 1401 and the audio clip (Odaiba 01) 1404, or simultaneously dragging the In points of the video clip (Odaiba 03) 1403 and the audio clip (Odaiba 03) 1406, it is possible to change the position on the time line without changing the length of and the position of the data referenced by the video clip (Odaiba 02) 1402 and the audio clip (Odaiba 02) 1405, by changing the length of the clips positioned to their front and rear.

(Trim Editing not Possible Display)

During the process of selecting trim points, it can happen that a combination of trim points for which trim editing is not possible arises. In other words, the operator attempts to select a combination of trim points that is not compatible with the editing device. In these cases, by indicating that trim editing is not possible at the time that the trim points have been selected, the operator can immediately become aware of this, and it is possible to re-select the trim points without carrying out abortive processing.

Various types of trim point selection for which trim editing is not possible can be conceived, but in the case of a combination of trim points that is different from the trim point selections of the five trim edits as described above, it is judged that trim edit is not possible.

Figure 15:
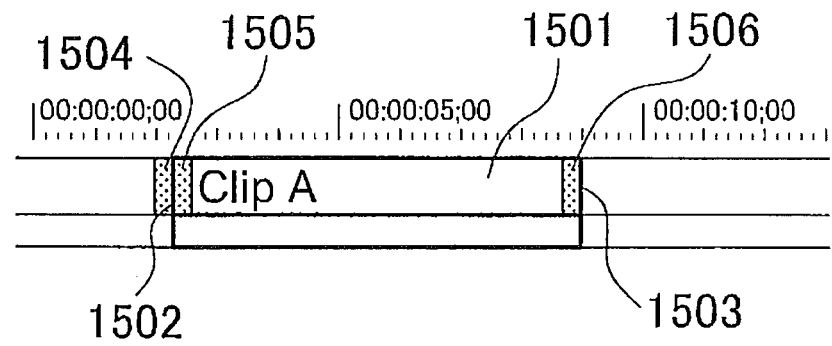
FIG. 15 is an explanatory diagram showing an example where trim editing is not possible.

An example of trim point selection for which editing is not possible is shown in FIG. 15.

As shown in FIG. 15, a clip (Clip A) 1501 arranged on the time line includes an In point 1502 and an Out point 1503. For example, assume that the mouse cursor is positioned near the Out point 1503 of the clip (Clip A) 1501 and clicked, to select the Out point as a trim point, and then the mouse cursor is positioned at the boundary position near the In point 1502 of the clip (Clip A) 1501 and clicked while pressing Ctrl. As stated previously in the explanation of the slide trim, by positioning the mouse cursor at the boundary position and clicking, it is possible to select both points to the front and rear of the boundary position as trim points. Therefore, the In point 1502 and the Out point 1503 of the clip (Clip A) 1501 and the front of the In point 1502 of the clip (Clip A) 1501 are selected as trim points. This combination of trim points is not consistent with the trim editing methods as described above, so it is judged that this is a trim point combination for which trim editing is not possible.

In this case, trim point display portions 1504, 1505, 1506 displayed at the positions corresponding to the selected trim points are displayed in a predetermined color that indicates that editing is not possible. As stated previously, in cases where trim processing can be properly carried out, the trim points are displayed in yellow or green, but in this case the trim points are displayed in a color that is different from these colors, for example, displayed in red.

Figure 16:
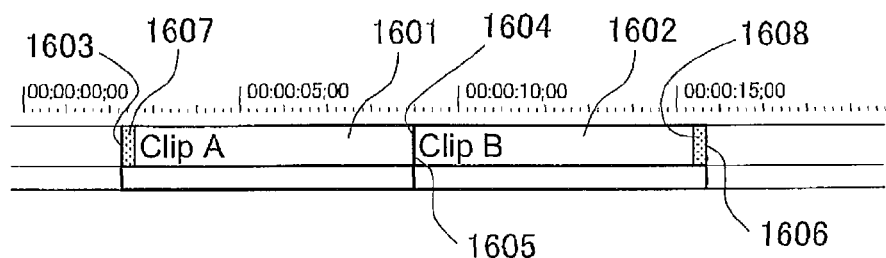
FIG. 16 is an explanatory diagram showing an example where trim editing is not possible.

In the example shown in FIG. 16, a clip (Clip A) 1601 arranged on the time line includes an In point 1603 and an Out point 1604, and a clip (Clip B) 1602 includes an In point 1605 and an Out point 1606. The Out point 1604 of the clip (Clip A) 1601 and the In point 1605 of the clip (Clip B) 1602 are contiguous.

Here, consider the case where the mouse cursor is positioned near the In point 1603 of the clip (Clip A) 1601 and clicked, and then the mouse cursor is positioned near the Out point 1606 of the clip (Clip B) 1602 and clicked while pressing Ctrl, so that both are selected as trim points. In this case also, the combination of trim points is not consistent with the trim editing methods as described above, so it is judged that this is a trim point combination for which trim editing is not possible.

Therefore, trim point display portions 1607, 1608 corresponding to the trim points selected here are displayed in a color that indicates that editing is not possible, for example red.

Figure 17:
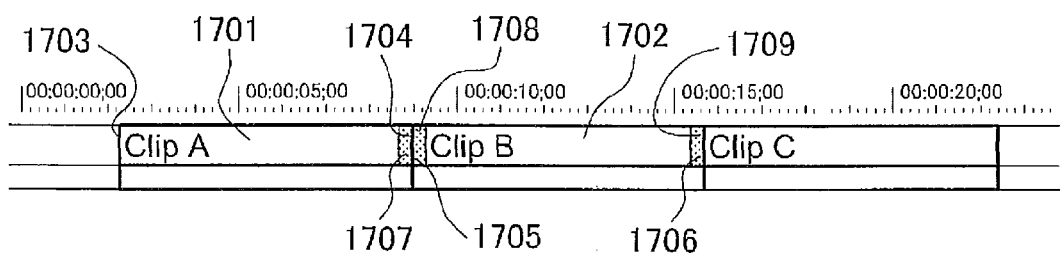
FIG. 17 is an explanatory diagram showing an example where trim editing is not possible.

In the example shown in FIG. 17, a clip (Clip A) 1701 arranged on the time line includes an In point 1703 and an Out point 1704, and a clip (Clip B) 1702 includes an In point 1705 and an Out point 1706. The Out point 1704 of the clip (Clip A) 1701 and the In point 1705 of the clip (Clip B) 1702 are contiguous.

Here, if the Out point 1704 of the clip (Clip A) 1701, the In point 1705 of the clip (Clip B) 1702, and the Out point 1706 of the clip (Clip B) 1702 are selected as trim points by the methods as described above, the combination of trim points is not consistent with the trim editing methods as described above, so it is judged that this is a trim point combination for which trim editing is not possible.

Therefore, trim point display portions 1707, 1708, 1709 corresponding to the trim points selected here are displayed in a predetermined color indicating that editing is not possible, for example red.

As above, at the stage where the trim points are selected, it is judged whether the combination of trim points is consistent with the trim editing methods provided in advance, and by displaying the fact that trim editing is not possible when it is judged that there is no corresponding trim editing method, the operator can immediately decide that trim editing is not possible, and can re-select the trim points before starting editing processes, such as dragging trim points, or the like. Therefore, it is possible to provide a user friendly system that eliminates unnecessary operations and increases the operability of trim editing.

(Simultaneous Trim of Different Tracks)

Consider the case of simultaneous trim edit of clips arranged on different tracks.

Figure 18:
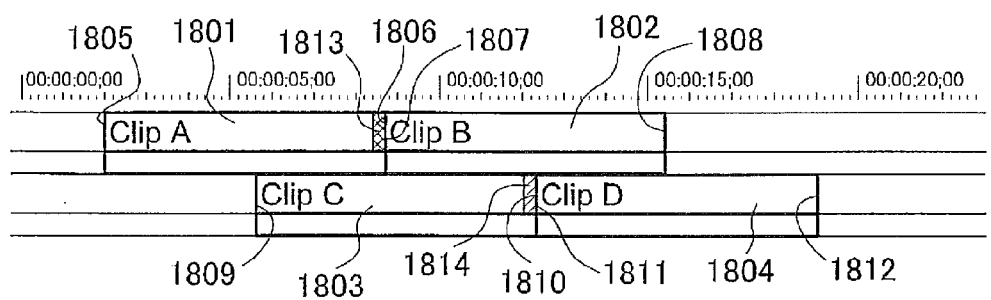
FIG. 18 is an explanatory diagram of trim editing synchronized between different tracks.

For example, consider the case where a clip (Clip A) 1801 and a clip (Clip B) 1802 are arranged on a single track, and a clip (Clip C) 1803 and a clip (Clip D) 1804 are arranged on a different track, as shown in FIG. 18. It is possible to carry out trim editing simultaneously on the clips arranged on the different tracks. However, the type of trim editing is the same for all tracks.

For example, assume that the clip (Clip A) 1801 includes an In point 1805 and an Out point 1806, and the clip (Clip B) 1802 includes an In point 1807 and an Out point 1808, and that the Out point 1806 of the clip (Clip A) 1801 and the In point 1807 of the clip (Clip B) 1802 are contiguous. Also, assume that the clip (Clip C) 1803 includes an In point 1809 and an Out point 1810, and the clip (Clip D) 1804 includes an In point 1811 and an Out point 1812, and that the Out point 1810 of the clip (Clip C) 1803 and the In point 1811 of the clip (Clip D) 1804 are contiguous.

By positioning the mouse cursor near the Out point 1806 of the clip (Clip A) 1801 and clicking, then positioning the mouse cursor near the Out point 1810 of the clip (Clip C) 1803 and clicking while pressing Ctrl, it is possible to select each point as a trim point.

At this time, in order to indicate that the trim points have been selected, trim point display portions 1813, 1814 are provided at the Out point 1806 of the clip (Clip A) 1801 and the Out point 1810 of the clip (Clip C) 1803, displayed in predetermined colors. In the example shown in the drawing, the trim point display portion 1813 is displayed in green, and the trim point display portion 1814 is displayed in yellow.

With the Out points of clips arranged on different tracks selected as trim points in this way, it is possible to carry out trim editing on the selected Out points of the clips arranged on the different tracks, by bringing the mouse cursor close to the trim points and dragging.

Figure 19:
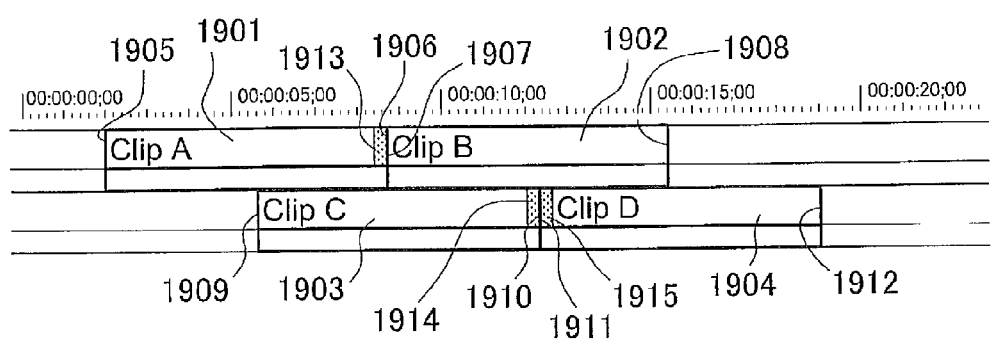
FIG. 19 is an explanatory diagram for the case where trim editing synchronized between different tracks is not possible.

In the same way, consider the case where a clip (Clip A) 1901 and a clip (Clip B) 1902 are arranged on a single track, and a clip (Clip C) 1903 and a clip (Clip D) 1904 are arranged on a different track, as shown in FIG. 19, and where trim editing is not possible.

For example, assume that the clip (Clip A) 1901 includes an In point 1905 and an Out point 1906, and the clip (Clip B) 1902 includes an In point 1907 and an Out point 1908, and that the Out point 1906 of the clip (Clip A) 1901 and the In point 1907 of the clip (Clip B) 1902 are contiguous. Also, assume that the clip (Clip C) 1903 includes an In point 1909 and an Out point 1910, and the clip (Clip D) 1904 includes an In point 1911 and an Out point 1912, and that the Out point 1910 of the clip (Clip C) 1903 and the In point 1911 of the clip (Clip D) 1904 are contiguous.

By positioning the mouse cursor near the Out point 1906 of the clip (Clip A) 1901 and clicking, then positioning the mouse cursor at the Out point 1910 of the clip (Clip C) 1903 and the In point 1911 of the clip (Clip D) 1904 and clicking while pressing Ctrl, it is possible to select each point as a trim point.

However, this combination of trim points does not correspond to the trim editing methods described previously, so it is judged that this is a combination of trim points for which trim edit is not possible.

Therefore, trim point display portions 1913, 1914, 1915 corresponding to the trim points selected here are displayed in a predetermined color, for example red, to indicate that edit is not possible.

In this case also, it is possible to recognize immediately whether editing is possible or not at the time of selecting the trim points, so it is possible to re-select the trim points before starting editing operations by dragging the trim points.

(Trim Window)

By switching the preview window to the trim mode it is possible to carry out trim operations. As stated previously, by clicking mode from the menu bar on the preview window and selecting trim from the pull down menu, the preview window is switched to the trim window, and operations can be carried out in the preview window.

The following is an explanation for the case where the preview window is switched to the trim mode as a trim window, and trim edit is carried out.

Figure 20:
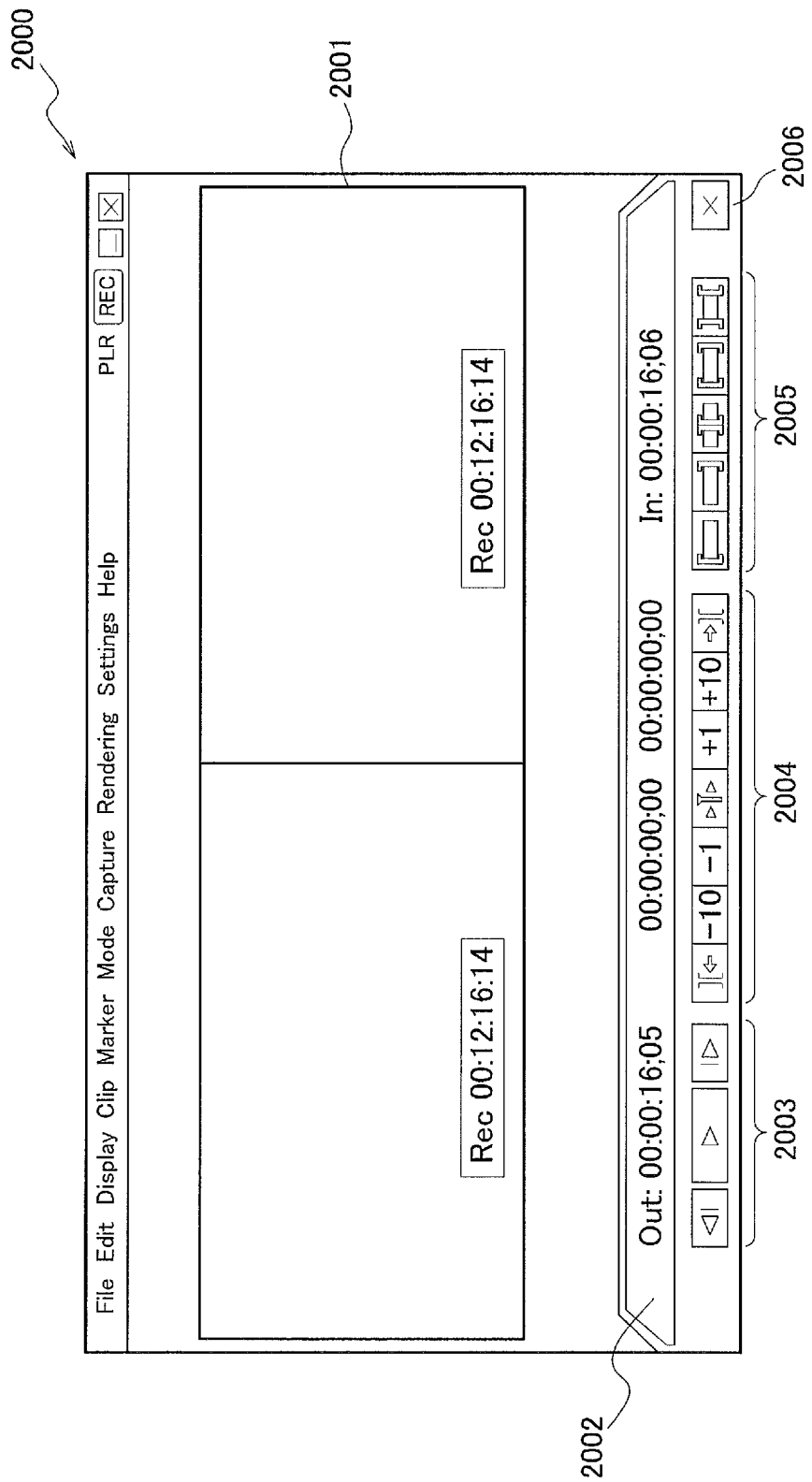
FIG. 20 is an explanatory diagram of the preview window during trim mode.

As shown in FIG. 20, a preview window 2000 displayed in the trim mode includes a player/recorder display window 2001, a time code display portion 2002, replay operation buttons 2003, trim operation buttons 2004, trim method selection buttons 2005, a switching button 2006 for switching to normal mode, and so on. Here, an example of display in dual mode in which the player display window and the recorder display window are displayed at the same time is shown.

The replay operation 2003 buttons include a button to move one frame back, a replay button for replaying in the forward direction on the time line, a button to move one frame forward, and so on.

The trim operation buttons 2004 include a button to move the time line cursor to the previous edit point, a button to adjust the trim position in units of −10 frames, a button to adjust the trim position in units of −1 frame, a button for repeatedly replaying near the editing point, a button to adjust the trim position in units of +1 frame, a button to adjust the trim position in units of +10 frames, a button to move the time line cursor to the next edit point, and so on.

The trim method selection buttons 2005 include an In point selection button, an Out point selection button, a slide selection button, a slip selection button, a rolling selection button, and so on. A trim cursor for one of In point, Out point, slide, slip, or rolling is displayed on the preview window in preview mode (hereafter referred to as the trim window), regardless of the selection or de-selection of trim point. If a rolling or slip trim is selected, its cursor is displayed, if a trim point is not selected, or if neither a rolling nor a slip trim is selected, the mouse cursor is displayed as the trim cursor for an In point, an Out point, or slide trim, depending on the position on the preview window.

Figure 21:
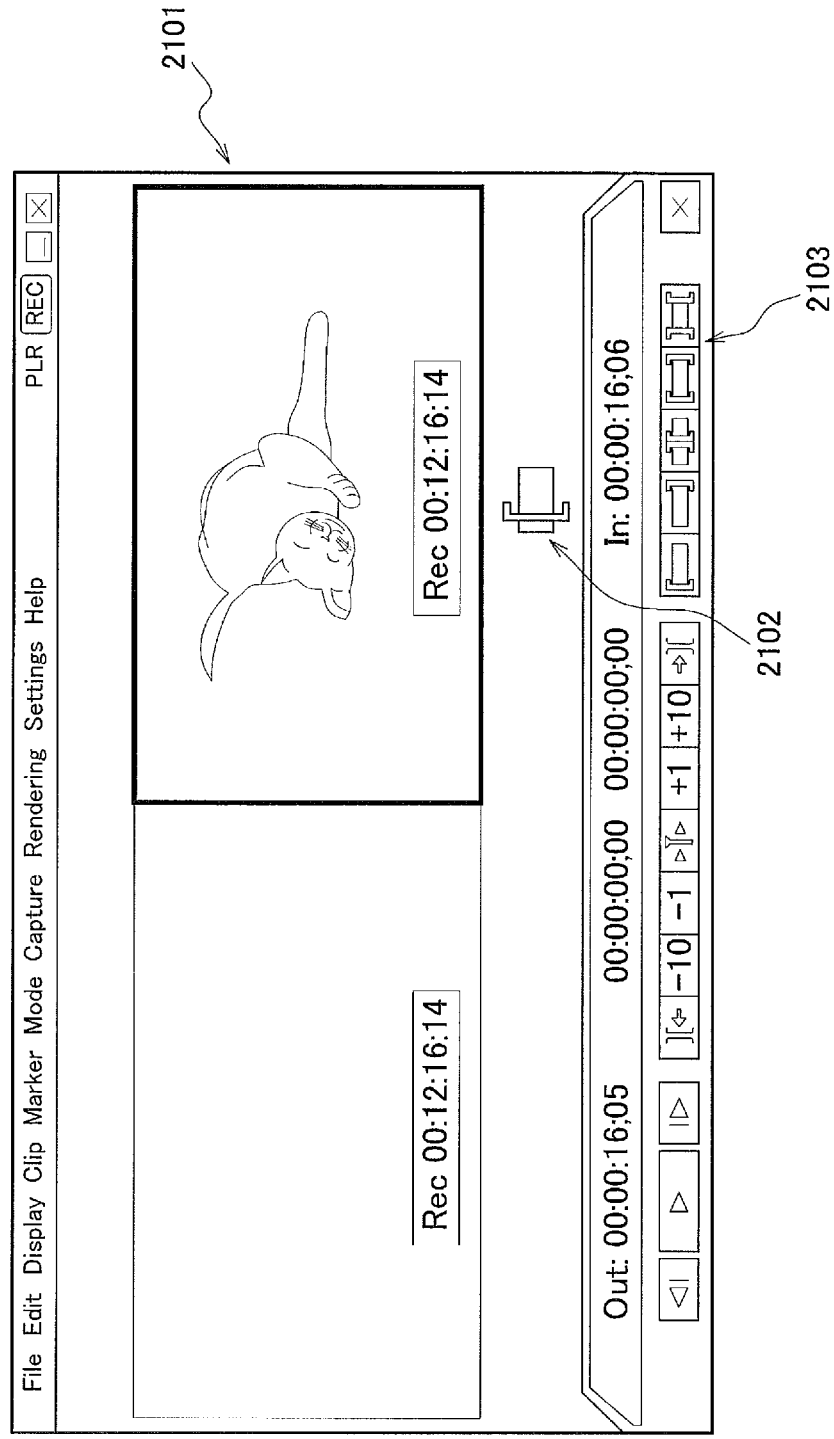
FIG. 21 is an explanatory diagram of the preview window during trim mode.

For example, as shown in FIG. 21, in a trim window 2101, when neither slip trim nor rolling trim are selected, when the mouse cursor is positioned in a predetermined area within the trim window 2101, the mouse cursor is changed to an In point trim cursor 2102. The trim cursor 2102 indicates that trim editing by In point selection is possible, and by clicking the mouse and dragging it to the left or right when the trim cursor 2102 is displayed within the trim window 2101, it is possible to carry out In point trim operations.

When the mouse is clicked when the In point trim cursor 2102 is displayed, the point closest to the time line cursor that can be trimmed on the track selected in the time line window is selected as a trim point, an a trim point display portion is displayed in a predetermined color (yellow). However, if a trim point that can be trimmed is already selected in the time line window, it is possible to carry out trimming of the trim point that is already selected, by dragging the trim cursor 2102 in the trim window 2101. Also, if the trim points already selected in the time line window includes a point inappropriate as an In point selection trim point, if the trim cursor 2102 is dragged on the trim window 2101, the trim points selected on the time line window will be cancelled, and the point closest to the time line cursor that can be trimmed on the track selected in the time line window will be re-selected as a trim point.

The predetermined area in which the mouse cursor changes into the In point trim cursor 2102 may be taken to be the right side area of the trim window 2101, for example, an area ⅓ to ⅔ of the right side of the trim window 2101.

Figure 22:
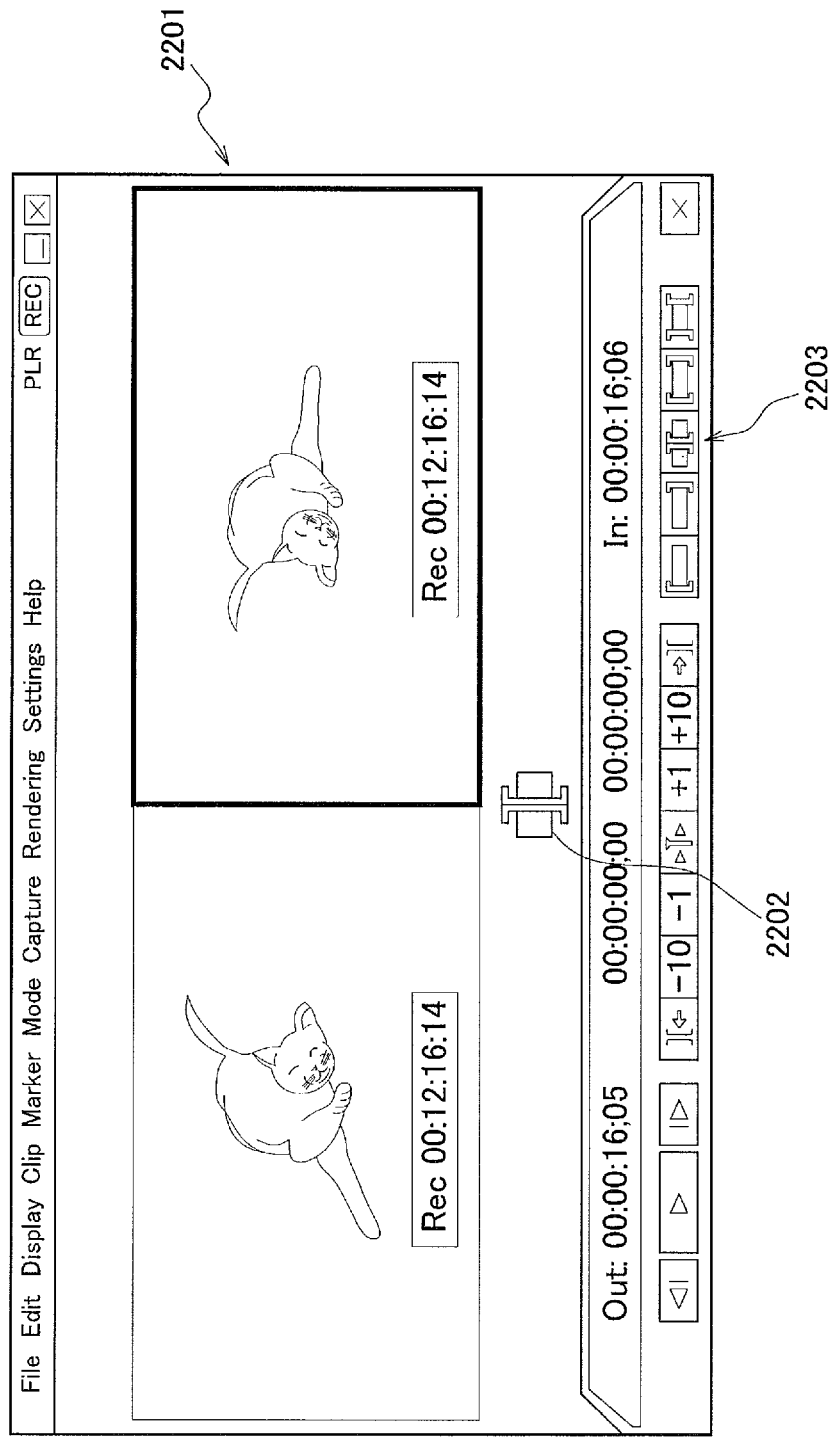
FIG. 22 is an explanatory diagram of the preview window during trim mode.

Also, as shown in FIG. 22, in a trim window 2201, when neither slip trim nor rolling trim are selected, when the mouse cursor is positioned in a predetermined area within the trim window 2201, the mouse cursor is changed to a slide trim cursor 2202. The trim cursor 2202 indicates that trim editing by slide trim is possible, and by clicking the mouse and dragging it to the left or right when the trim cursor 2202 is displayed within the trim window 2201, it is possible to carry out slide trim operations.

When the mouse is clicked when the slide trim cursor 2202 is displayed, the point closest to the time line cursor that can be trimmed on the track selected in the time line window is selected as a trim point, an a trim point display portion is displayed in a predetermined color (yellow or green). However, if a trim point that can be trimmed is already selected in the time line window, it is possible to carry out trimming of the trim point that is already selected, by dragging the trim cursor 2202 in the trim window 2201. Also, if the trim points already selected in the time line window includes a point inappropriate as a slide trim point, if the trimming cursor 2202 is dragged on the trim window 2201, the trim points selected on the time line window will be cancelled, and the point closest to the time line cursor that can be trimmed on the track selected in the time line window will be re-selected as a trim point.

The predetermined area in which the mouse cursor changes into the slide trim cursor 2202 may be taken to be the central area of the trim window 2201, for example, an area ⅓ to ⅕ of the central area of the trim window 2201.

Figure 23:
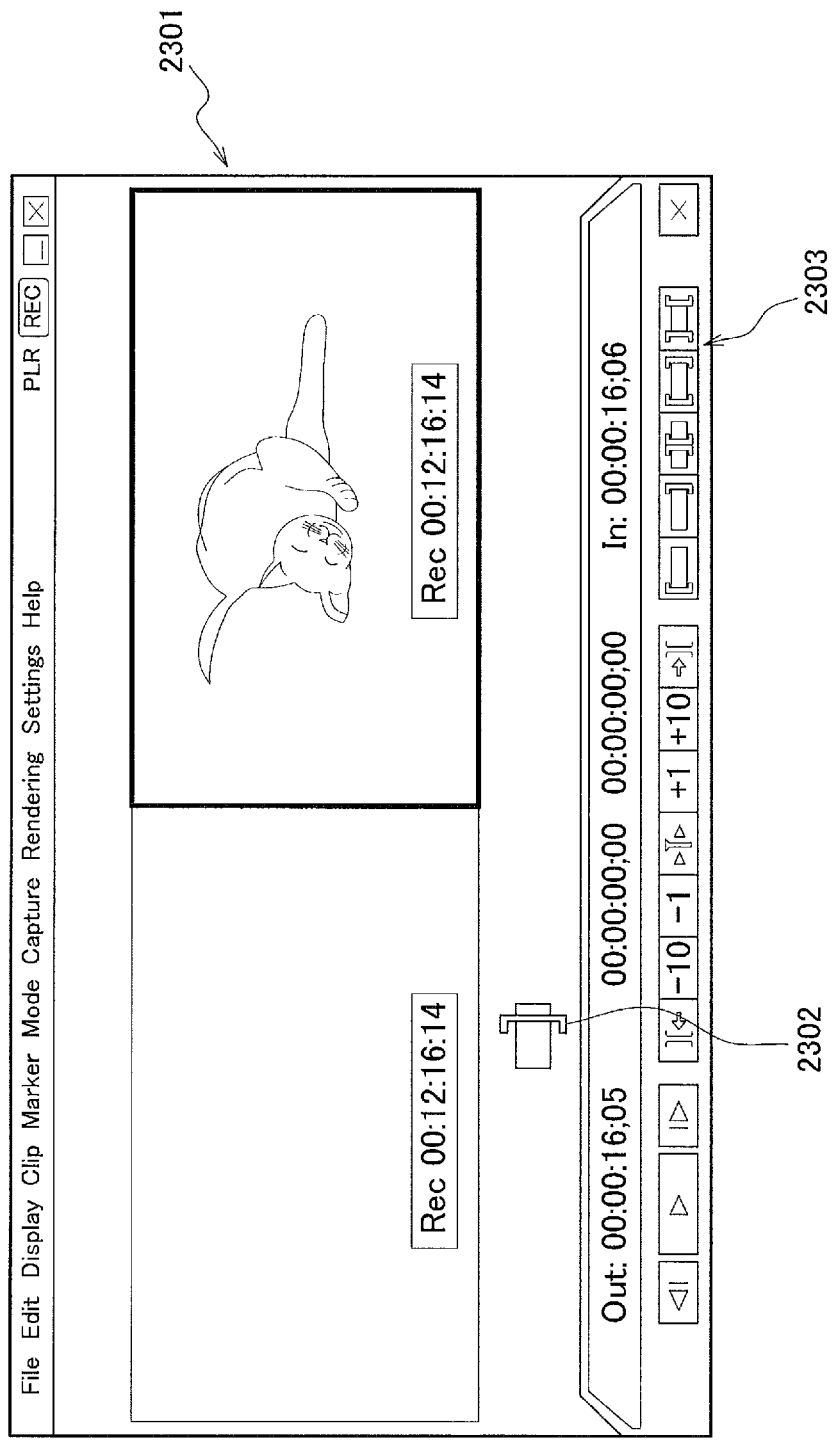
FIG. 23 is an explanatory diagram of the preview window during trim mode.

Also, as shown in FIG. 23, in a trim window 2301, when neither slip trim nor rolling trim are selected, when the mouse cursor is positioned in a predetermined area within the trim window 2301, the mouse cursor is changed to an Out point selection trim cursor 2302. The trim cursor 2302 indicates that trim editing by Out point selection is possible, and by clicking the mouse and dragging it to the left or right when the trim cursor 2302 is displayed within the trim window 2301, it is possible to carry out Out point trim operations.

When the mouse is clicked when the Out point trim cursor 2302 is displayed, the point closest to the time line cursor that can be trimmed on the track selected in the time line window is selected as a trim point, a trim point display portion is displayed in a predetermined color (yellow). However, if a trim point that can be trimmed is already selected in the time line window, it is possible to carry out trimming of the trim point that is already selected, by dragging the trim cursor 2302 in the trim window 2301. Also, if the trim points already selected in the time line window includes a point inappropriate as an Out point selection trim point, if the trim cursor 2302 is dragged on the trim window 2301, the trim points selected on the time line window will be cancelled, and the point closest to the time line cursor that can be trimmed on the track selected in the time line window will be re-selected as a trim point.

The predetermined area in which the mouse cursor changes into the Out point trim cursor 2302 may be taken to be the left side area of the trim window 2301, for example, an area ⅓ to ⅔ of the left side of the trim window 2301.

The areas in which the mouse cursor changes to an In point selection, slip trim, or Out point selection trim cursor is not limited to the areas as described above.

Figure 24:
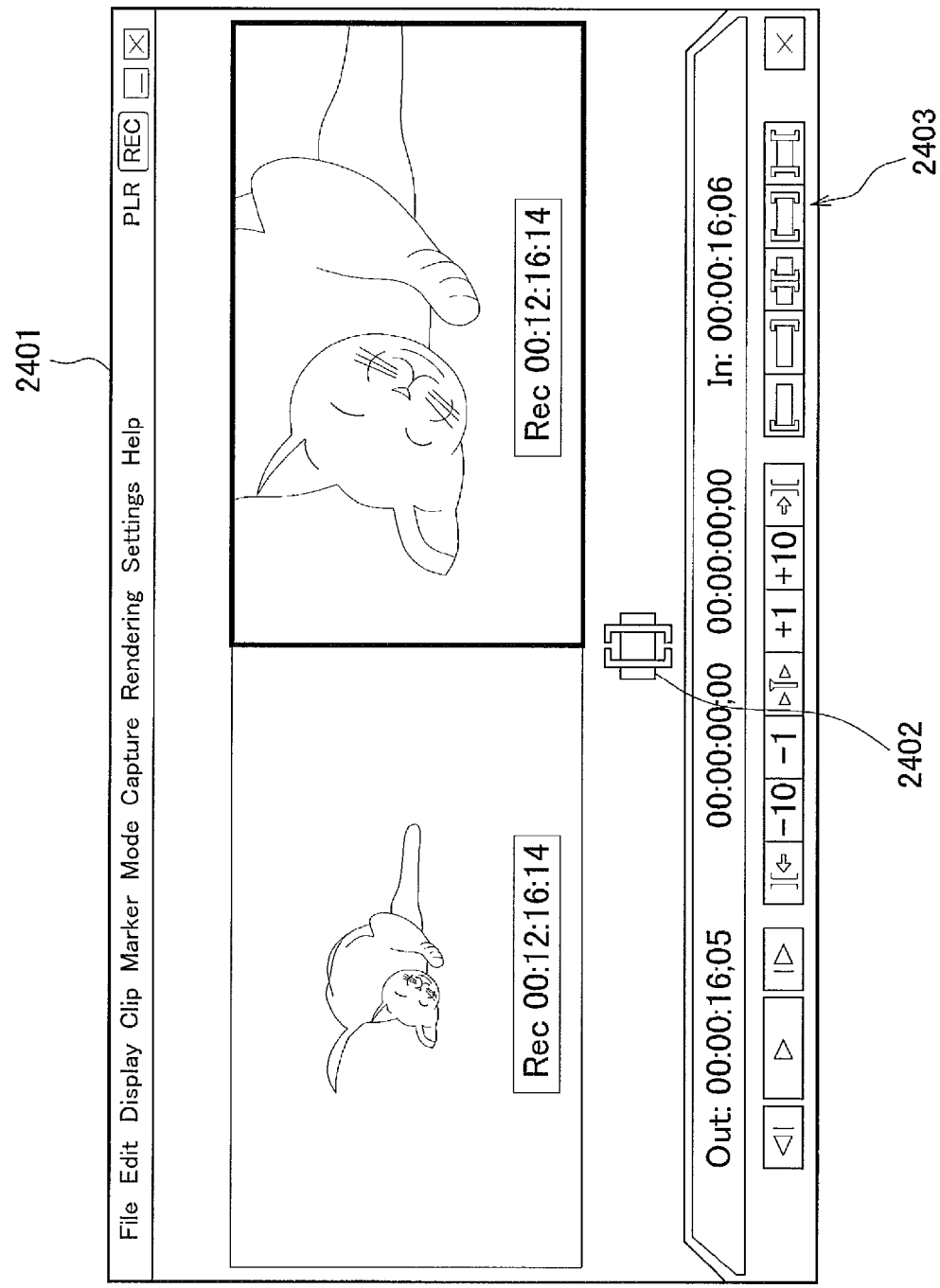
FIG. 24 is an explanatory diagram of the preview window during trim mode.

When the slip trim button of the trimming method selection buttons 2403 is operated in a trim window 2401, as shown in FIG. 24, or if the trim points selected in the time line window are already the selection for a slip trim, when the mouse cursor is positioned within the trim window 2401, the mouse cursor is changed into a slip trim cursor 2402. The trim cursor 2402 indicates that trim editing by slip trim is possible, and by clicking the mouse and dragging it to the left or right when the trim cursor 2402 is displayed within the trim window 2401, it is possible to carry out slip trim operations.

When the mouse is clicked when the slip trim cursor 2402 is displayed, the point closest to the time line cursor that can be trimmed on the track selected in the time line window is selected as a trim point, an a trim point display portion is displayed in a predetermined color (yellow or green). However, if a trim point that can be trimmed is already selected in the time line window, it is possible to carry out trimming of the trim point that is already selected, by dragging the trim cursor 2402 in the trim window 2401. Also, if the trim points already selected in the time line window includes a point inappropriate as an slip trim point, the trim points selected on the time line window will be cancelled, and the point closest to the time line cursor that can be trimmed on the track selected in the time line window will be re-selected as a trim point.

Figure 25:
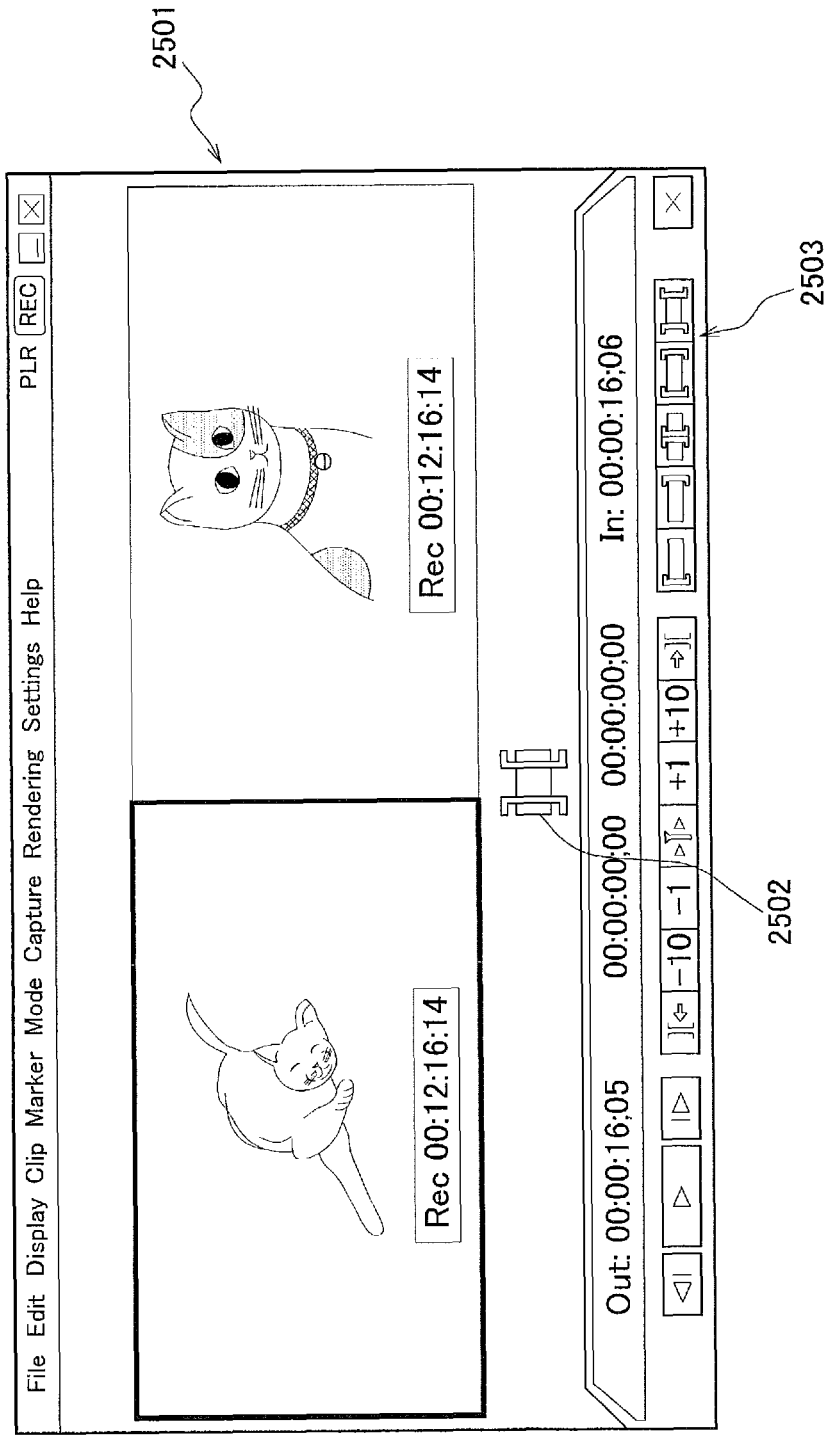
FIG. 25 is an explanatory diagram of the preview window during trim mode.

When the rolling trim button of the trimming method selection buttons 2503 is operated in a trim window 2501, as shown in FIG. 25, or if the trim points selected in the time line window are already the selection for a rolling trim, when the mouse cursor is positioned within the trim window 2501, the mouse cursor is changed into a rolling trim cursor 2502. The trim cursor 2502 indicates that trim editing by rolling trim is possible, and by clicking the mouse and dragging it to the left or right when the trim cursor 2502 is displayed within the trim window 2501, it is possible to carry out rolling trim operations.

When the mouse is clicked when the rolling trim cursor 2502 is displayed, the point closest to the time line cursor that can be trimmed on the track selected in the time line window is selected a trim point, a trim point display portion is displayed in a predetermined color (yellow or green). However, if a trim point that can be trimmed is already selected in the time line window, it is possible to carry out trimming of the trim point that is already selected, by dragging the trim cursor 2502 in the trim window 2501. Also, if the trim points already selected in the time line window includes a point inappropriate as an rolling trim point, the trim points selected on the time line window will be cancelled, and the point closest to the time line cursor that can be trimmed on the track selected in the time line window will be re-selected as a trim point.

(Ripple Trim)

If a ripple mode is selected, when carrying out trim editing, the position on the time line is changed to keep pace with the following clip. For example, when changing an Out point with the ripple mode set, the clip arranged on the same track following the clip that is the subject of the trim editing is moved in sync on the time line. Also, if a synchronize mode is set, clips on other tracks can also be coupled.

This kind of ripple trim normally changes the position on the time line of the clips following on after the Out point of a clip at the front of a time series. In the case of trimming by In point selection, the position of the data referenced by the In point of a clip that is the subject of trimming is changed without changing the position on the time line of the In point, and the position on the time line of the Out point of the clip is changed in accordance with the trimming. The clips positioned later in the time series are coupled with the Out point of the clip that is the subject of trimming, and are moved accordingly on the time line. In the case of a slip trim, of the clips that are subject to trimming, the Out point of the clip that is positioned at the rear of a time series does not move, so there is no change in the position of the following clips. Also, in the case of a slide trim or a rolling trim, the boundary between adjacent clips is moved on the time line, so overall the Out points do not change.

Other Embodiments

Notification that trim editing is not possible may also be indicated by reversing the display color when the trim cursor is displayed.

Also, notification that trim editing is not possible may also be carried out with a beep, warning sound, or other sound from the computer, or another form that the operator can perceive.

INDUSTRIAL APPLICABILITY

The present invention may be applied to a device for editing moving images and/or sound data, and may be constituted as an editing device constituted from computer hardware such as a personal computer or the like on which application software for editing is installed. In the editing device and editing method according to the present invention, when carrying out trim editing, the operator can recognize whether trim editing is possible or not by just selecting the trim points, so it is possible to eliminate unnecessary work, and increase the operability.

The invention claimed is:

1. An editing device having a function of trim editing for moving images and/or sound data, comprising:
 a receiving unit being configured to receive command input of trim point for trim editing, the command input indicating a selection of a plurality of trim points;
 a judging unit being configured to judge whether trim editing of the indicated selection is either possible or not possible based on the command input received by the receiving unit; and
 a notification unit being configured to output notification that trim editing is not possible for the indicated selection when the judging unit judges that trim editing is not possible,
 wherein the judging unit evaluates whether trim editing of the indicated selection is either possible or not possible upon receipt of a selection of each of the plurality of trim points.

2. The editing device according to claim 1, wherein
 the notification unit outputs display data for carrying out a first display at at least one of the plurality of trim points when the judging unit judges that trim editing is possible, the at least one of the plurality of trim points indicating a trim operation position, and
 the notification unit outputs display data for carrying out a second display when the judging unit judges that trim editing is not possible, the second display being different from the first display at the trim point.

3. The editing device according to claim 2, wherein the first display is displayed in a predetermined color, and the second display is displayed in a color that is different from the predetermined color of the first display.

4. The editing device according to claim 1, wherein when the judging unit judges that trim editing is not possible, the notification unit outputs predetermined sound data.

5. The editing device according to claim 1, wherein the trim editing includes a combination of at least two trims among a normal trim that specifies an In point or an Out point, a slide trim, a slip trim, and a rolling trim, and wherein the judging unit judges whether the combination of the at least two trims is either possible or not possible based on the command input received by the receiving unit.

6. The editing device according to claim 5, wherein the trim editing includes a ripple mode, and a process of the trim editing varies depending on whether the ripple mode is on or off.

7. An editing method on an editing device having a function of trim editing for moving images and/or sound data, comprising the steps of:
 receiving command input of trim point for trim editing, the command input indicating a selection of a plurality of trim points;
 judging whether trim editing of the indicated selection is either possible or not possible based on the received command input; and
 outputting notification that editing is not possible for the indicated selection when judging that trim editing is not possible,
 wherein judging includes evaluating whether trim editing of the indicated selection is either possible or not possible upon receipt of a selection of each of the plurality of trim points.

8. An editing program product recorded on a non-transitory computer-readable medium for allowing an editing device having a function of trim editing for moving images and/or sound data to execute the steps of:
 receiving command input of trim point for trim editing, the command input indicating a selection of a plurality of trim points;
 judging whether trim editing for the indicated selection is either possible or not possible based on the received command input; and
 outputting notification that editing is not possible for the indicated selection when judging that trim editing is not possible,
 wherein judging includes evaluating whether trim editing of the indicated selection is either possible or not possible upon receipt of a selection of each of the plurality of trim points.

9. The editing device according to claim 1, wherein the judging unit judges whether trim editing is either possible or not possible based on determining whether a predefined editing method corresponds to a combination of the selected plurality of trim points.

10. The editing device according to claim 9, wherein the combination of the selected plurality of trim points comprises trim points corresponding to a combination of at least two trims among a normal trim that specifies an In point and an Out point, a slide trim, a slip trim, and a rolling trim.

11. The editing device according to claim 1, wherein the plurality of trim points comprise a combination of at least three trim points.

12. The editing device according to claim 1, wherein the judging unit judges that trim editing is not possible when trim editing of the indicated selection of the plurality of trim points is different than a normal trim, a slide trim, a slip trim, and a rolling trim.

13. The editing device according to claim 1, wherein the plurality of trim points selected include audio and video trim points to be edited simultaneously.

14. The editing device according to claim 1, wherein the plurality of trim points comprise trim points corresponding to video clips arranged on different tracks, and wherein the judging unit determines that trim editing of the indicated selection is not possible when trim editing of the video clips on separate tracks simultaneously is not possible based on the selected trim points.

* * * * *